(12) United States Patent
Duan et al.

(10) Patent No.: US 10,255,740 B2
(45) Date of Patent: Apr. 9, 2019

(54) SYSTEMS AND METHODS FOR UNLOCKING A LOCK

(71) Applicant: JIANGSU HONGBAO HARDWARE CO., LTD, Suzhou (CN)

(72) Inventors: Wei Duan, Beijing (CN); Tao Fang, Beijing (CN); Zhifeng Hu, Beijing (CN); Qizhong Hu, Beijing (CN); Wei Zhang, Beijing (CN)

(73) Assignee: JIANGSU HONGBAO HARDWARE CO., LTD., Suzhou (CN)

( * ) Notice: Subject to any disclaimer, the term of this patent is extended or adjusted under 35 U.S.C. 154(b) by 0 days.

(21) Appl. No.: 15/844,027

(22) Filed: Dec. 15, 2017

(65) Prior Publication Data

US 2018/0182196 A1 Jun. 28, 2018

(30) Foreign Application Priority Data

Dec. 28, 2016 (CN) .......................... 2016 1 1231891
Dec. 28, 2016 (CN) .......................... 2016 1 1232665

(Continued)

(51) Int. Cl.
*G07C 9/00* (2006.01)
*E05B 47/00* (2006.01)
(Continued)

(52) U.S. Cl.
CPC ...... *G07C 9/00309* (2013.01); *E05B 63/0065* (2013.01); *G07C 9/00571* (2013.01);
(Continued)

(58) Field of Classification Search
CPC ............ E05B 19/0005; G07C 9/00023; G07C 9/00103; H04W 12/06; H04W 12/08; H04W 74/00; H04W 76/10; H04W 8/265
See application file for complete search history.

(56) References Cited

U.S. PATENT DOCUMENTS 7,558,964 B2    7/2009 Bermudez et al.
2002/0035515 A1*  3/2002 Moreno ............... A47G 29/141
                                                340/5.73
(Continued)

FOREIGN PATENT DOCUMENTS

CN      1401519 A      3/2003
CN      101118660 A    2/2008
(Continued)

OTHER PUBLICATIONS

International search report in PCT/CN2017/113287 dated Feb. 11, 2016, 4 pages.
(Continued)

*Primary Examiner* — Omeed Alizada
(74) *Attorney, Agent, or Firm* — Metis IP LLC

(57) ABSTRACT

A method for unlocking a lock may include receiving, via a network, a first service request to unlock a lock from a terminal device. The first service request may be associated with a wireless connection between the lock and the terminal device. The method may also include transmitting, via the network, a password associated with the first service request to the terminal device and receiving an input associated with the terminal device. The method may further include determining whether the received input satisfies an unlocking condition and actuating, based on a result of the determination that the received input satisfies the unlocking condition, a locking mechanism to unlock the lock.

21 Claims, 13 Drawing Sheets

(30) Foreign Application Priority Data

| Dec. 28, 2016 | (CN) | 2016 1 1232976 |
| --- | --- | --- |
| Dec. 28, 2016 | (CN) | 2016 1 1232987 |
| Dec. 28, 2016 | (CN) | 2016 1 1234695 |
| Dec. 28, 2016 | (CN) | 2016 1 1234715 |
| Dec. 28, 2016 | (CN) | 2016 2 1462310 |
| Dec. 30, 2016 | (CN) | 2016 1 1252211 |
| Feb. 15, 2017 | (CN) | 2017 1 0081494 |

(51) Int. Cl.

| E05B 63/00 | (2006.01) |
| --- | --- |
| E05B 67/28 | (2006.01) |
| E05B 71/00 | (2006.01) |
| H04L 29/06 | (2006.01) |

(52) U.S. Cl.
CPC ........ *H04L 63/083* (2013.01); *E05B 47/0012* (2013.01); *E05B 67/28* (2013.01); *E05B 71/00* (2013.01); *E05B 2047/0094* (2013.01); *G07C 2009/00769* (2013.01)

(56) References Cited

U.S. PATENT DOCUMENTS

| 2010/0011418 | A1* | 1/2010 | Despain | G07C 9/00023 |
| --- | --- | --- | --- | --- |
| | | | | 726/4 |
| 2011/0025459 | A1* | 2/2011 | Denison | G06Q 20/18 |
| | | | | 340/5.51 |
| 2012/0196631 | A1 | 8/2012 | Fajstrup Axelsen | |
| 2013/0338883 | A1 | 12/2013 | Savoure | |
| 2015/0074004 | A1 | 3/2015 | Song | |
| 2016/0196701 | A1 | 7/2016 | Strother et al. | |
| 2018/0018840 | A1 | 1/2018 | Xia et al. | |

FOREIGN PATENT DOCUMENTS

| CN | 101226652 A | 7/2008 |
| --- | --- | --- |
| CN | 101521901 A | 9/2009 |
| CN | 201584019 U | 9/2010 |
| CN | 201649904 U | 11/2010 |
| CN | 102142173 A | 8/2011 |
| CN | 102542649 A | 7/2012 |
| CN | 102817503 A | 12/2012 |
| CN | 103634819 A | 3/2014 |
| CN | 104103111 A | 10/2014 |
| CN | 104464067 A | 3/2015 |
| CN | 104794645 A | 7/2015 |
| CN | 104636860 A | 8/2015 |
| CN | 104853050 A | 8/2015 |
| CN | 204706096 U | 10/2015 |
| CN | 105046774 | 11/2015 |
| CN | 105064752 A | 11/2015 |
| CN | 105096469 A | 11/2015 |
| CN | 204926315 U | 12/2015 |
| CN | 105243752 A | 1/2016 |
| CN | 105321236 A | 2/2016 |
| CN | 105425653 A | 3/2016 |
| CN | 105491576 A | 4/2016 |
| CN | 105513184 A | 4/2016 |
| CN | 105517038 A | 4/2016 |
| CN | 105574960 A | 5/2016 |
| CN | 105701893 A | 6/2016 |
| CN | 205281615 U | 6/2016 |
| CN | 105857277 A | 8/2016 |
| CN | 105882599 A | 8/2016 |
| CN | 105957201 A | 9/2016 |
| CN | 106251212 A | 12/2016 |
| CN | 106408730 A | 2/2017 |
| CN | 106548555 A | 3/2017 |
| CN | 106600792 A | 4/2017 |
| CN | 106600793 A | 4/2017 |
| CN | 106652141 A | 5/2017 |
| CN | 106652232 A | 5/2017 |
| CN | 106713644 A | 5/2017 |
| CN | 206193989 U | 5/2017 |
| CN | 106800058 A | 6/2017 |
| CN | 106853851 A | 6/2017 |
| CN | 206537394 U | 10/2017 |
| DE | 19938064 A1 | 8/2000 |
| EP | 1281588 A2 | 2/2003 |
| JP | H11212689 A | 8/1999 |
| JP | 5475042 B2 | 4/2014 |

OTHER PUBLICATIONS

Written Opinion in PCT/CN2017/113287 dated Feb. 11, 2018, 5 pages.

* cited by examiner

SYSTEMS AND METHODS FOR UNLOCKING A LOCK

CROSS-REFERENCE TO RELATED APPLICATIONS

This application claims priority to Chinese Application No. 201611232976.7 filed on Dec. 28, 2016, Chinese Application No. 201611232987.5 filed on Dec. 28, 2016, Chinese Application No. 201611252211.X filed on Dec. 30, 2016, Chinese Application No. 201611232665.0 filed on Dec. 28, 2016, Chinese Application No. 201611231891.7 filed on Dec. 28, 2016, Chinese Application No. 201611234695.5 filed on Dec. 28, 2016, Chinese Application No. 201710081494.4 filed on Feb. 15, 2017, Chinese Application No. 201611234715.9 filed on Dec. 28, 2016, and Chinese Application No. 201621462310.6 filed on Dec. 28, 2016. Each of the above-referenced applications is incorporated herein by reference in their entireties.

TECHNICAL FIELD

The present disclosure generally relates to security systems, and in particular, to systems and methods for unlocking a lock in the security systems.

BACKGROUND

A lock is an important tool to secure a device (e.g., a door, a bicycle, a drawer). Thus, it may be desirable to develop mechanisms to control the lock efficiently and better secure a device that needs to be secured.

SUMMARY

One aspect of the present disclosure is directed to a system including a lock and a server. The lock includes a locking mechanism configured to move between a locking position of the lock and an unlocking position of the lock and a controller configured to actuate the locking mechanism to lock or unlock the lock. The server includes a storage device including a set of instructions, and a processor in communication with the storage device. When executing the set of instructions, the processor is configured to cause the server to receive, via a network, a first service request to unlock the lock from a terminal device, the first service request being associated with a wireless connection between the lock and the terminal device. The processor is further configured to transmit, via the network, a password associated with the first service request to the terminal device, where the controller of the lock is further configured to receive an input associated with the terminal device. The controller of the lock is further configured to determine whether the received input satisfies an unlocking condition, and actuate, based on a result of the determination that the received input satisfies the unlocking condition, the locking mechanism to unlock the lock.

In some embodiments, to determine whether the received input satisfies an unlocking condition, the controller is further configured to: determine whether a password included in the received input associated with the terminal device is consistent with a pre-stored password in the lock; and determine, based on a result of the determination that the password included in the received input associated with the terminal device is consistent with the pre-stored password in the lock, that the received input satisfies the unlocking condition.

In some embodiments, the pre-stored password is obtained from the server at a time point when a prior service transaction associated with a prior service request is completed.

In some embodiments, the pre-stored password includes a plurality of candidate passwords and each of the plurality of candidate passwords corresponds to a valid period.

In some embodiments, the lock has a plurality of modes including a dormant mode and a working mode, and the controller of the lock is further configured to determine whether a service transaction associated with the first service request is completed. The controller of the bicycle is further configured to include set, based on a result of the determination that the service transaction associated with the first service request is completed, the mode of the lock to the dormant mode.

In some embodiments, the controller of the lock is further configured to: determine whether a password associated with a second service request is obtained; and set, based on a result of the determination that the password associated with the second service request is obtained, the mode of the lock to the working mode.

In some embodiments, the lock further includes a communication port, where the controller of the lock is further configured to determine lock information associated with the lock and to determine service information based, at least in part, on the lock information, the communication port being configured to transmit the service information to the server.

In some embodiments, the lock information includes at least one of lock identification information, a time point when the lock is unlocked, or a time point when the lock is locked. The service information includes at least one of the lock information, a user identity associated with the terminal device, a start location associated with the first service request, or a destination associated with the first service request.

In some embodiments, the controller of the lock is further configured to: determine whether a connection between the lock and the server is established; store, based on a result of the determination that the connection is not established, the service information in a storage device in the lock.

Another aspect of the present disclosure is directed to a method including receiving, via a network, a first service request to unlock a lock from a terminal device, the first service request being associated with a wireless connection between the lock and the terminal device. The method also includes transmitting, via the network, a password associated with the first service request to the terminal device. The method also includes receiving an input associated with the terminal device. The method also includes determining whether the received input satisfies an unlocking condition. The method also includes actuating, based on a result of the determination that the received input satisfies the unlocking condition, a locking mechanism to unlock the lock.

Yet another aspect of the present disclosure is directed to a lock including a locking mechanism configured to move between a locking position of the lock and an unlocking position of the lock and a communication port. The lock also includes a controller configured to receive an input associated with a terminal device, the received input including unlocking information received by the terminal device from a server in response to a first service request transmitted from the terminal device to the server to unlock the lock. The service request includes information relating to a wireless connection between the communication port of the lock and the terminal device. The controller of the lock is further configured to determine whether the received input satisfies an unlocking condition, and to actuate, based on a result of the determination that the received input satisfies the unlocking condition, the locking mechanism to unlock the lock.

In some embodiments, to determine whether the received input satisfies an unlocking condition, the controller of the lock is further configured to determine whether a password included in the received input associated with the terminal device is consistent with a pre-stored password in the lock. The controller of the lock is further configured to determine, based on a result of the determination that the password included in the received input associated with the terminal device is consistent with the pre-stored password in the lock, that the received input satisfies the unlocking condition.

In some embodiments, the pre-stored password is obtained from the server at a time point when a prior service transaction associated with a prior service request is completed.

In some embodiments, the pre-stored password includes a plurality of candidate passwords and each of the plurality of candidate passwords corresponds to a valid period.

In some embodiments, the lock has a plurality of modes including a dormant mode and a working mode, and the controller of the lock is further configured to determine whether a service transaction associated with the first service request is completed. The controller of the lock is further configured to include set, based on a result of the determination that the service transaction associated with the first service request is completed, the mode of the lock to the dormant mode.

In some embodiments, the controller of the lock is further configured to: determine whether a password associated with a second service request is obtained; and set, based on a result of the determination that the password associated with the second service request is obtained, the mode of the lock to the working mode.

In some embodiments, the lock further includes a communication port, where the controller of the lock is further configured to determine lock information associated with the lock and to determine service information based, at least in part, on the lock information, the communication port of the lock being configured to transmit the service information to the server.

In some embodiments, the lock information includes at least one of lock identification information, a time point when the lock is unlocked, or a time point when the lock is locked. The service information includes at least one of the lock information, a user identity associated with the terminal device, a start location associated with the first service request, or a destination associated with the first service request.

In some embodiments, the controller of the lock is further configured to: determine whether a connection between the lock and the server is established; store, based on a result of the determination that the connection is not established, the service information in a storage device in the lock.

Yet another aspect of the present disclosure is directed to a method, including receiving an input associated with a terminal device, the received input including unlocking information received by the terminal device from a server in response to a first service request transmitted from the terminal device to the server to unlock a lock. The service request includes information relating to a wireless connection between a communication port of the lock and the terminal device. The method also includes determining whether the received input satisfies an unlocking condition, and actuating, based on a result of the determination that the received input satisfies the unlocking condition, a locking mechanism to unlock the lock.

Yet another aspect of the present disclosure is directed to a terminal device including a storage device storing a set of instructions, and a processor in communication with the storage device. When executing the set of instructions, the processor is configured to cause the terminal device to: receive a plurality of wireless signals from a plurality of locks and determine a plurality of intensities of the plurality of wireless signals. The processor is also configured to cause the terminal device to determine a plurality of distances between the terminal device and the plurality of locks based on the plurality of intensities. The processor is further configured to cause the terminal device to rank the plurality of locks based on the plurality of distances, and select, based on the ranking, one of the locks. The processor is further configured to cause the terminal device to establish, based on the ranking, a wireless connection between the terminal device and the selected lock, and transmit, via a network, a service request to unlock the selected lock to a server, where the service request includes information relating to the wireless connection between the terminal device and the selected lock. The processor is further configured to cause the terminal device to receive, via the network, unlock information from the server, the unlock information being generated by the server in response to the service request.

In some embodiments, the processor is further configured to transmit, via the wireless connection and to the selected lock, an instruction to unlock the selected lock.

Yet another aspect of the present disclosure is directed to a method including receiving a plurality of wireless signals from a plurality of locks and determining a plurality of intensities of the plurality of wireless signals. The method also includes determining a plurality of distances between the terminal device and the plurality of locks based on the plurality of intensities, and ranking the plurality of locks based on the plurality of distances. The method further includes selecting, based on the ranking, one of the locks, and establishing, based on the ranking, a wireless connection between the terminal device and the selected lock. The method further includes transmitting, via a network, a service request to unlock the selected lock to a server, where the service request includes information relating to the wireless connection between the terminal device and the selected lock. The method also includes receiving, via the network, unlock information from the server, the unlock information being generated by the server in response to the service request.

In some embodiments, the method further includes transmitting, via the wireless connection and to the selected lock, an instruction to unlock the selected lock.

Yet another aspect of the present disclosure is directed to a non-transitory computer-readable medium embodying a computer program product, the computer program product comprising instructions configured to cause a computing device to perform a method including receiving, via a network, a first service request to unlock a lock from a terminal device, the first service request being associated with a wireless connection between the lock and the terminal device. The method also includes transmitting, via the network, a password associated with the first service request to the terminal device. The method also includes receiving an input associated with the terminal device. The method also includes determining whether the received input satisfies an unlocking condition. The method also includes actuating, based on a result of the determination that the received input satisfies the unlocking condition, a locking mechanism to unlock the lock.

Yet another aspect of the present disclosure is directed to a non-transitory computer-readable medium embodying a computer program product, the computer program product comprising instructions configured to cause a computing device to perform a method including receiving an input associated with a terminal device, the received input including unlocking information received by the terminal device from a server in response to a first service request transmitted from the terminal device to the server to unlock a lock. The service request includes information relating to a wireless connection between a communication port of the lock and the terminal device. The method also includes determining whether the received input satisfies an unlocking condition, and actuating, based on a result of the determination that the received input satisfies the unlocking condition, a locking mechanism to unlock the lock.

Yet another aspect of the present disclosure is directed to a non-transitory computer-readable medium embodying a computer program product, the computer program product comprising instructions configured to cause a computing device to perform a method including receiving a plurality of wireless signals from a plurality of locks and determining a plurality of intensities of the plurality of wireless signals. The method also includes determining a plurality of distances between the terminal device and the plurality of locks based on the plurality of intensities, and ranking the plurality of locks based on the plurality of distances. The method further includes selecting, based on the ranking, one of the locks, and establishing, based on the ranking, a wireless connection between the terminal device and the selected lock. The method further includes transmitting, via a network, a service request to unlock the selected lock to a server, where the service request includes information relating to the wireless connection between the terminal device and the selected lock. The method also includes receiving, via the network, unlock information from the server, the unlock information being generated by the server in response to the service request.

Yet another aspect of the present disclosure is directed to a method. The method may include receiving a password included in an input associated with a user and determining whether the password is consistent with a pre-stored password in a lock obtained from a server. The method may further include unlocking, based on a result of the determination that the password included in the input associated with the user is consistent with the pre-stored password, the lock. The method may further include recording a start time, determining whether a locking instruction is triggered, and recording, based on a result of the determination that the locking instruction is triggered, an end time. The method may also include transmitting service information including the start time, the end time, the password included in the input associated with the user, and a serial number of the lock to the server.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
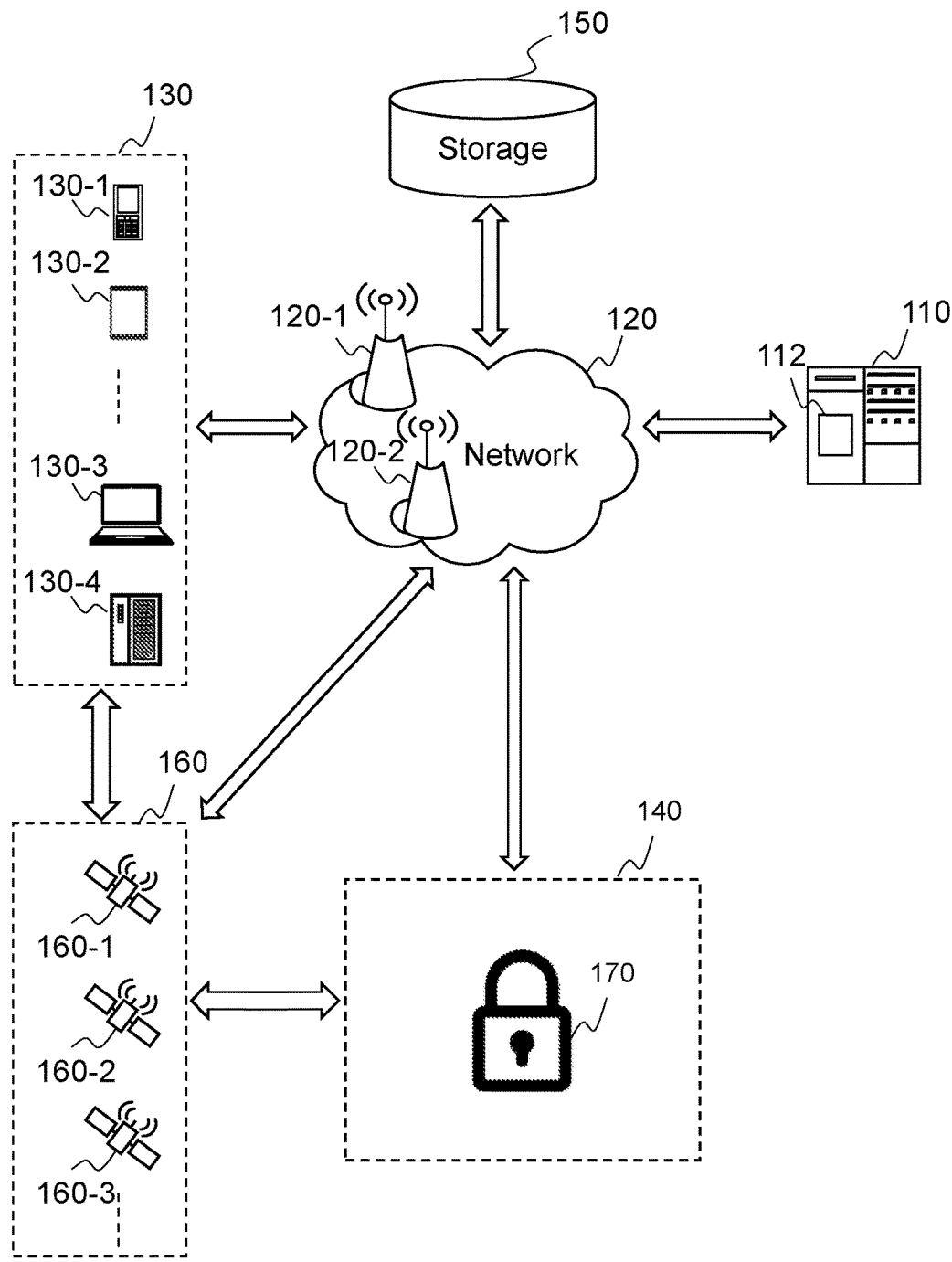
FIG. 1 is a schematic diagram illustrating an exemplary security system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is to describe particular exemplary embodiments only and is not intended to be limiting. As used herein, the singular forms "a," "an," and "the" may be intended to include the plural forms as well, unless the context expressly indicates otherwise. It will be further understood that the terms "comprise," "comprises," and/or "comprising," "include," "includes," and/or "including," when used in the present disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of the present disclosure. It is to be expressly understood, however, that the drawings are for the purpose of illustration and description only and are not intended to limit the scope of the present disclosure. It is understood that the drawings are not to scale.

It will be understood that the term "system," "engine," "unit," and/or "module" used herein are one method to distinguish different components, elements, parts, sections, or assemblies of different levels in ascending order. However, the terms may be displaced by other expressions if they achieve the same purpose.

It will be understood that when a unit, engine, or module is referred to as being "on," "connected to," or "coupled to," another unit, engine, or module, it may be directly on, connected or coupled to, or communicate with the other unit, engine, or module, or an intervening unit, engine, or module may be present, unless the context clearly indicates otherwise. As used herein, the term "and/or" includes any and all combinations of one or more of the associated listed items.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Moreover, while the systems and methods described in the present disclosure are described primarily regarding a bicycle sharing service, it should also be understood that they are merely exemplary embodiments. The systems or methods described in the present disclosure may apply to any other kind of economic sharing service that transfers a usufruct from one to another in an online rental transaction. For example, the systems or methods of the present disclosure may apply to physical asset renting and/or a labor service. The physical asset may include real estate (e.g., a hotel, a room, or an apartment), vehicles (e.g., a car, a bicycle, an electric bicycle, a bus, a hot-air balloon, or an airplane), goods (e.g., clothes, an umbrella, a charger, or a microphone), etc. The labor service may include pet adoption, housekeeping, designated driving, etc. The application of the systems or methods of the present disclosure may include a web page, a plug-in for a browser, a client terminal, a custom system, an internal analysis system, an artificial intelligence robot, or the like, or any combination thereof.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

It should be noted that the bicycle sharing service is a new form of service rooted only in post-Internet era. It provides technical solutions to users and service providers that could raise only in the post-Internet era. In the pre-Internet era, when a user needs to rent a bicycle in a bicycle rental shop, the bicycle request and acceptance occur only between the user and a shopkeeper of the bicycle rental shop who meet each other at a physical place. Through the Internet (and/or other types of network technology like Bluetooth), the bicycle sharing service, however, allows a user of the service to acquire a location of a bicycle accurately and rent a bicycle anywhere and anytime. It also allows the user to park the bicycle in any area where the parking of the bicycle is allowed. Therefore, through the Internet, a bicycle sharing system may provide a more convenient transaction platform for users and service providers that may never meet in the settings of the traditional, pre-Internet bicycle service.

The present disclosure relates to systems and methods for unlocking a lock in security systems. The systems and methods may be implemented by a server, workstation, a lock (e.g., a lock in a bicycle, a lock in a vehicle, a lock in a door to a secured place), and/or a terminal device. For example, the server may obtain a service request from a terminal device and provide a reference unlocking password that may be used to unlock a lock. After receiving the reference unlocking password, a requestor may enter the password via the terminal device or an input device of the lock. The lock may determine whether a password included in the input is consistent with a pre-stored password in the lock. According to a result of the determination that the password included in the input is consistent with the pre-stored password, the lock may unlock the lock. Further, the lock may determine service information associated with the service request and transmit the service information to the server.

FIG. 1 is a schematic diagram illustrating an exemplary security system 100 according to some embodiments of the present disclosure. The security system 100 may include a server 110, a network 120, one or more terminal devices 130, a device 140, a storage 150, a positioning device 160, and a lock 170. The security system 100 may secure the device 140 by the lock 170 by implementing the methods and/or processes disclosed in the present disclosure. In some embodiments, the device 140 to be secured may be a bicycle in a bicycle sharing system. The bicycle sharing system may provide a bicycle sharing service allowing a user to use a bicycle for a ride. When the user finishes the ride and wants to return the bicycle, the user may leave the bicycle in an area where the parking of the bicycle is allowed. The bicycle may then be ready for a next user.

The server 110 may communicate with the terminal device 130, the device 140, and/or the lock 170 to provide various functionalities of the security system 100. In some embodiments, the server 110 may receive a request associated with the device 140 from the terminal device 130 via, for example, the network 120. For example, the server 110 may receive a request to unlock the device 140 from the terminal device 130 via, for example, the network 120. As another example, the device 140 may be a bicycle in a bicycle sharing system and the request may be a service request to borrow (or rent) the bicycle. The service request may include order information relating to the ride and/or the bicycle, including, for example, a bicycle type, a departing place, a destination, mileage, a route, or the like, or any combination thereof. The service request may also include the information relating to the user (e.g., the user account information) and/or the terminal device 130 (e.g., the location of the terminal device 130).

The server 110 may also transmit information to the terminal device 130, the device 140, and/or the lock 170. For instance, the server 110 may transmit to a device 140 and/or the lock 170 an instruction to lock the device 140, an instruction to unlock the device 140, and/or the information related to the device 140 (e.g., the information indicating whether the device 140 is locked). In some embodiments, the device 140 may be a bicycle in a bicycle sharing system. The server 110 may determine one or more bicycles in response to the service order received from the terminal device 130 and transmit the information relating to the one or more bicycles to the terminal device 130, including, for example, the locations of the one or more bicycles, the fees for the ride (e.g., the total fees for the ride, the hourly rate for the ride), or the like, or a combination thereof.

The server 110 may also determine a hotspot area based on historical data obtained from the terminal device 130, the bicycle, and/or the storage 150. The hotspot area may be an area where bicycles are in high demand. The historical data may include the number of searches for a bicycle in an area. The historical data may also include data relating to historical service orders (e.g., the number of times that the bicycles have been used in an area). The historical data may further include information provided by users via the terminal devices 130 (e.g., advice to place more bicycles in some area submitted by users). The server 110 may also provide a service fee management. The server 110 may determine the cost of a ride based on a monthly membership, a quarterly membership, a season (e.g., spring, summer) membership, an annual membership, or fees per ride.

In some embodiments, the server 110 may be a single server or a server group. The server group may be a centralized server group connected to the network 120 via an access point or a distributed server group connected to the network 120 via one or more access points, respectively. In some embodiments, the server 110 may be locally connected to the network 120 or in remote connection with the network 120. For example, the server 110 may access information and/or data stored in the terminal device 130, the device 140, and/or the storage 150 via the network 120. As another example, the storage 150 may serve as backend data storage of the server 110. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the server 110 may include a processing engine 112. The processing engine 112 may process information and/or data associated with a service request to perform one or more functions in the present disclosure. For example, the processing engine 112 may obtain a service request from the terminal device 130 and transmit unlock information (e.g., an unlocking password) to the terminal device 130. In some embodiments, the processing engine 112 may include one or more processing units (e.g., single-core processing engine(s) or multi-core processing engine(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the security system 100 (e.g., the server 110, the terminal device 130, the device 140, the storage 150, or the lock 170) may transmit information and/or data to another component(s) in the security system 100 via the network 120. For example, the server 110 may access and/or obtain data of a plurality of devices 140 from the storage 150 via the network 120. As another example, the server 110 may transmit a message indicating whether the device 140 is locked to the terminal device 130 via the network 120. As yet another example, the positioning device 160 may transmit positioning information to the terminal device 130 via the network 120. In some embodiments, the network 120 may be any wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the security system 100 may be connected to the network 120 to exchange data and/or information.

In some embodiments, a user may be an owner of the terminal device 130. The terminal device 130 may receive input from the user and transmit the information relating to the input to the server 110 via the network 120. The terminal device 130 may also receive information from the server 110 via the network 120. For example, the terminal device 130 may receive input from the user relating to the device 140 to the server 110, receive a service confirmation, and/or information or instructions from the server 110. Merely by way of example, a user may input a request for maintenance service when he or she fails to lock the device 140. The terminal device 130 may be configured to transmit the request for maintenance service to the server 110. In some embodiments, the device 140 may be a bicycle in a bicycle sharing system. The terminal device 130 may be configured to transmit a service request to the server 110 for searching for bicycles near the location of the terminal device 130. The server 110 may determine one or more bicycles (e.g., the locations of the bicycles, number of the bicycles) near the location of the terminal device 130 according to and in response to the service request. The server 110 may also transmit information relating to the determined one or more bicycles to the terminal device 130 via the network 120. The information of the determined one or more bicycles may be displayed on the terminal device 130 associated with an electronic map. The terminal device 130 may receive input from the user indicating a selected bicycle from the bicycles displayed on the terminal device 130, which may be transmitted to the server 110. The terminal device 130 may also provide a walking navigation for guiding the user to the location of the selected bicycle. As another example, the terminal device 130 may receive input from the user for reserving a bicycle and transmit the information to the server 110. As yet another example, the terminal device 130 may transmit feedback information provided by the user to the server 110. The feedback information may include the status of the bicycle (e.g., whether any part of the bicycle needs to be repaired), improvement suggestions, etc.

In some embodiments, the terminal device 130 may include a mobile device 130-1, a tablet computer 130-2, a laptop computer 130-3, a built-in device in a vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, smart glass, a smart helmet, a smartwatch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a Hololens™, a Gear VR™, etc. In some embodiments, a built-in device in the vehicle 130-4 may include a built-in computer, a built-in onboard television, a built-in tablet, etc. In some embodiments, the terminal device 130 may include a signal transmitter and a signal receiver configured to communicate with the positioning device 160 for locating the position of the user and/or the terminal device 130. In some embodiments, the terminal device 130 may include a signal transmitter and a signal receiver configured to communicate with the positioning device 160 for locating the position of the user and/or the terminal device 130. For example, the terminal device 130 may transmit an instruction to the positioning device 160 to locate the position of the user and/or the terminal device 130.

The device 140 may include any device that needs to be secured. Exemplary devices 140 may include a bicycle, a car, a door, a window, a cabinet, a drawer, a package, a safe box, a luggage, a or the like, or any combination thereof. The lock 170 may be configured to lock the device 140. The lock 170 may include any combination of mechanisms to implement the functions thereof. The lock 170 may be a mechanical lock or an electronic lock. The device 140 and the lock 170 may be separate parts that are mechanically connected to each other. For example, the device 140 and the lock 170 may be separate parts and the lock 170 may be mounted on the device 140. Additionally or alternatively, the device 140 and the lock may form an integral device. Details regarding the lock 170 may be found elsewhere in the present disclosure (e.g., FIGS. 4 to 13 and the relevant descriptions thereof).

In some embodiments, the device 140 may be a bicycle. The bicycle may be any type of bicycle including, for example, a unicycle, a bicycle, a tricycle, a tandem, a motor bicycle, an electric bicycle, a moped, etc. The color of a bicycle is not limiting. Merely by way of example, the color of the body of the bicycle may be yellow. In some embodiments, a bicycle and/or the lock 170 may be identified with a unique symbol. The unique symbol may include a barcode, a quick response (QR) code, a serial number including letters and/or digits, or the like, or any combination thereof. For example, the identification (ID) of the lock 170 may be obtained by scanning the QR code of the lock 170 through a mobile application of the terminal device 130 or a camera of the terminal device 130 (if any). Merely by way of example, the ID of the lock 170 may be obtained by scanning the QR code of the bicycle through a camera of an iPhone.

The device 140 and/or the lock 170 may communicate with the server 110, the network 120, the terminal device 130, and/or the positioning device 160. For example, the device 140 and/or the lock 170 may transmit status information of the device 140 and/or the lock 170 to the server 110 via the network 120. The status information may include a location of the device 140, a locked/unlocked status of the device 140, battery power of the device 140, operation information of the lock 170, or the like, or a combination thereof. The server 110 may monitor the device 140 based on the status information. As another example, the device 140 and/or the lock 170 may receive an instruction (e.g., an instruction to lock/unlock the device 140) from the terminal device 130 and/or the server 110. As yet another example, the device 140 may include a signal transmitter and a signal receiver (e.g., a GPS component of the device 140) configured to communicate with the positioning device 160 for locating a position of the device 140.

The storage 150 may store data and/or instructions. The data may include data related to users, terminal devices 130, devices 140, etc. In some embodiments, the device 140 may be a bicycle of a bicycle sharing system. The data related to the users may include user profiles including for example, names of the users, mobile numbers of the users, ID numbers of the users, types of the users (e.g., annual card users, quarterly card users, or monthly card users), usage records of the users (e.g., riding time, cost), credit rating of the users, historical routes, account balance, etc. The data related to the bicycles may include service conditions of the bicycles (an inactive state, a booking state, on a ride, in a maintenance state, in a loss state), positions of the bicycles, types of the bicycles (e.g., a unicycle, a bicycle, a tricycle, a tandem, a motor bicycle, an electric bicycle), etc. In some embodiments, the storage 150 may store data obtained from the terminal device 130 and/or the device 140. For example, the storage 150 may store log information associated with the terminal device 130. In some embodiments, the storage 150 may store data and/or instructions that the server 110 may execute or use to perform exemplary methods described in the present disclosure.

In some embodiments, the storage 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The positioning device 160 may determine information associated with an object, for example, one or more of the terminal device 130, or the device 140 (e.g., a bicycle). For example, the positioning device 160 may determine a current time and a current location of the terminal device 130 and/or the device 140. In some embodiments, the positioning device 160 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, and/or a current time. The location may be in the form of coordinates, such as a latitude coordinate and a longitude coordinate, etc. The positioning device 160 may include one or more satellites, for example, a satellite 160-1, a satellite 160-2, and a satellite 160-3. The satellite 160-1 through 160-3 may determine the information mentioned above independently or jointly. The positioning device 160 may transmit the information mentioned above to the terminal device 130, or the device 140 via the network 120.

In some embodiments, one or more components of the security system 100 may access the data and/or instructions stored in the storage 150 via the network 120. In some embodiments, the storage 150 may be directly connected to the server 110 as a backend storage. In some embodiments, one or more components of the security system 100 (e.g., the server 110, the terminal device 130, or the device 140) may have permissions to access the storage 150. In some embodiments, one or more components of the security system 100 may read and/or modify the information related to the user, and/or the device 140 when one or more conditions are met. For example, the server 110 may read and/or modify one or more users' information after a ride of the bicycle is completed.

In some embodiments, the device 140 may be a bicycle of a bicycle sharing system. The information exchange between one or more components of the security system 100 may be initiated by way of launching the mobile application of the bicycle sharing service on a terminal device 130, requesting a bicycle service, or inputting a query via the terminal device 130 (e.g., searching for a bicycle). The object of the service request may be any product. In some embodiments, the product may include food, medicine, commodity, chemical product, electrical appliance, clothing, car, housing, luxury, or the like, or any combination thereof. In some other embodiments, the product may include a service product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistant (PDA), a smartwatch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application related to transporting may include a traveling software and/or application, a vehicle scheduling software and/or application, a mapping software and/or application, etc.

One of ordinary skill in the art would understand that when an element of the security system 100 performs, the element may perform through electrical signals and/or electromagnetic signals. For example, when a terminal device 130 processes a task, such as making a determination, unlocking a device 140, the terminal device 130 may operate logic circuits in its processor to process such task. When the terminal device 130 transmits out a query (e.g., information relating to a location of a device 140) to the server 110, a processor of the terminal device 130 may generate electrical signals encoding the query. The processor of the terminal device 130 may then transmit the electrical signals to an output port. If the terminal device 130 communicates with the server 110 via a wired network, the output port may be physically connected to a cable, which further transmits the electrical signal to an input port of the server 110. If the terminal device 130 communicates with the server 110 via a wireless network, the output port of the terminal device 130 may be one or more antennas, which convert the electrical signals to electromagnetic signals. Similarly, a device 140 and/or the lock 170 may process a task through operation of logic circuits in its processor, and receive an instruction and/or service order from the server 110 via electrical signals or electromagnet signals. Within an electronic device, such as the terminal device 130, the device 140, the lock 170, and/or the server 110, when a processor thereof processes an instruction, transmits out an instruction, and/or performs an action, the instruction and/or action is conducted via electrical signals. For example, when the processor retrieves data (e.g., a plurality of user profiles) from a storage medium (e.g., the storage 150), it may transmit out electrical signals to a reading device of the storage medium, which may read structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
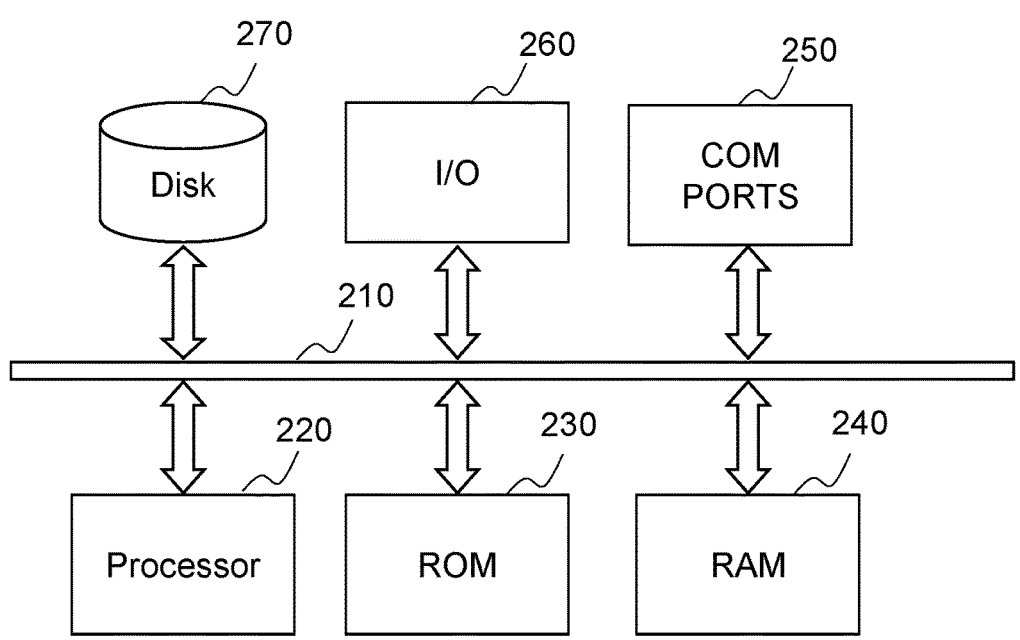
FIG. 2 is a schematic diagram illustrating hardware and/or software components of an exemplary computing device according to some embodiments of the present disclosure.

FIG. 2 is a schematic diagram illustrating exemplary hardware and/or software components of a computing device 200 according to some embodiments of the present disclosure. The computing device 200 may be used to implement any component of the security system 100 as described herein. For example, the processing engine 112 of the server 110, and/or the terminal device 130 may be implemented on the computing device 200, via its hardware, software program, firmware, or a combination thereof. Although only one such computer is shown for convenience, the computer functions related to the security system 100 as described herein may be implemented in a distributed manner on a number of similar platforms to distribute the processing load.

The computing device 200, for example, may include COM ports 250 connected to and from a network (e.g., the network 120) connected thereto to facilitate data communications. The computing device 200 may also include a processor 220 for executing program instructions to perform the functions of the server 110 described herein. The exemplary computer platform may include an internal communication bus 210, program storage and data storage of different forms, for example, a disk 270, and a read-only memory (ROM) 230, or a random access memory (RAM) 240, for various data files to be processed and/or transmitted by the computer. The exemplary computer platform may also include program instructions stored in the ROM 230, the RAM 240, and/or another type of non-transitory storage medium to be executed by the processor 220. The methods and/or processes of the present disclosure may be implemented as the program instructions. The computing device 200 also includes an I/O 260, supporting input/output between the computer, the user, and other components therein.

The computing device 200 may also receive programming and data via network communications.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, the CPU and/or processor of the computing device 200 may execute both step A and step B. As in another example, step A and step B may also be performed by two different CPUs and/or processors jointly or separately in the computing device 200 (e.g., the first processor executes step A and the second processor executes step B, or the first and second processors jointly execute steps A and B).

Figure 3:
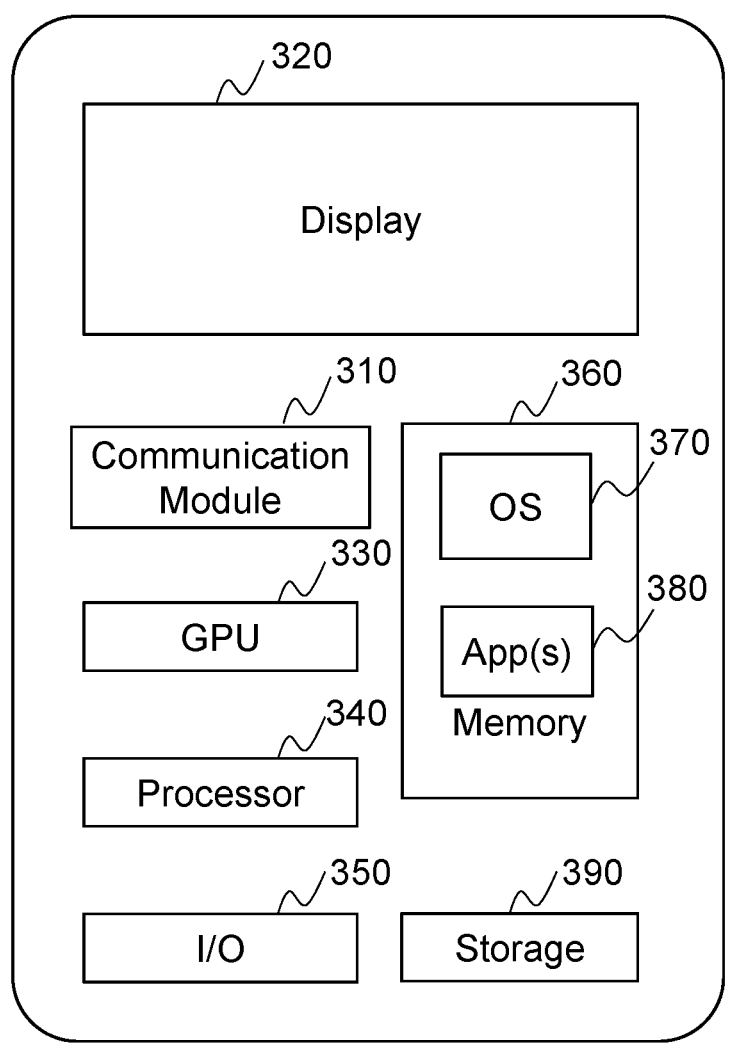
FIG. 3 is a schematic diagram illustrating hardware and/or software components of an exemplary mobile device according to some embodiments of the present disclosure.

FIG. 3 is a schematic diagram illustrating exemplary hardware and/or software components of a mobile device 300 on which a terminal device 130 may be implemented according to some embodiments of the present disclosure. As illustrated in FIG. 3, the mobile device 300 may include a communication module 310, a display 320, a graphics processing unit (GPU) 330, a processor 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the processor 340. The applications 380 may include a browser or any other suitable apps for transmitting, receiving and presenting information relating to the status of the device 140 (e.g., the location of the device 140) from the server 110. User interactions with the information stream may be achieved via the I/O 350 and provided to the server 110 and/or other components of the security system 100 via the network 120. In some embodiments, a user may borrow (or rent) a device 140 (e.g., a bicycle) via the mobile device 300. The user may also control the lock 170 of the device 140 via the mobile device 300. For example, the user may input an instruction to close the lock via the mobile device 300.

Figure 4:
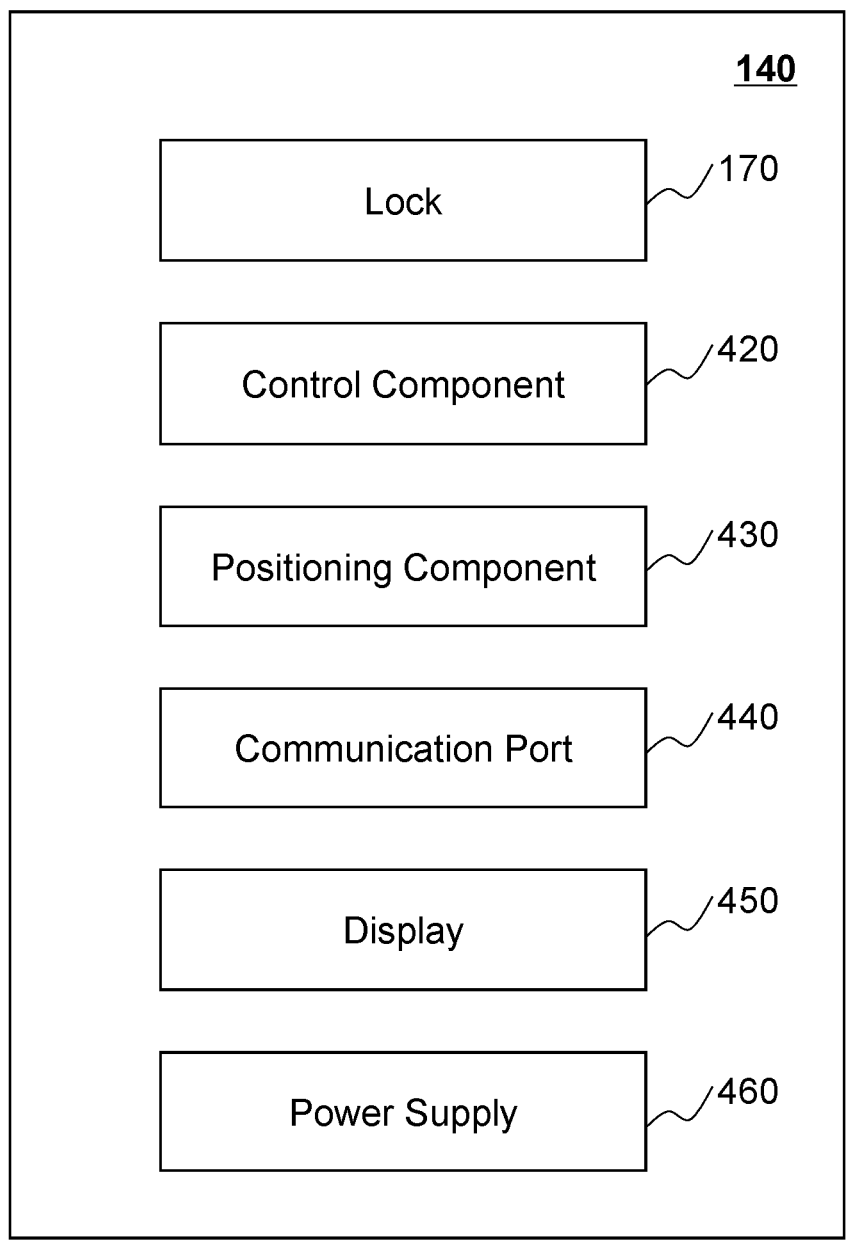
FIG. 4 is a schematic diagram illustrating hardware and/or software components of an exemplary device needs to be secured according to some embodiments of the present disclosure.

FIG. 4 is a schematic diagram illustrating exemplary hardware and/or software components of a device 140 needs to be secured according to some embodiments of the present disclosure. The device 140 may include a lock 170, a control component 420, a positioning component 430, a communication port 440, a display 450, and a power supply 460.

The lock 170 may be configured to secure the device 140. For example, the device 140 may be a bicycle of a bicycle sharing system and the lock 170 may be configured to lock one or more wheels of the bicycle. In some embodiments, the lock 170 may be configured to secure the bicycle to a fixed object such as a bicycle lock pillar or a rack. The lock 170 may include any combination of mechanisms to implement the function thereof. For example, the lock 170 may include a mechanical lock or an electronic lock. In some embodiments, the lock 170 may include one or more processing units (e.g., single-core processing engine(s) or multi-core processing engine(s)). Merely by way of example, the lock 170 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The control component 420 may control operations of other components of the device 140 (e.g., the lock 170, the positioning component 430, and/or the communication port 440). For example, the device 140 may be a bicycle of a bicycle sharing system and the control component 420 may control the lock 170 to be opened (i.e., releasing the bicycle) and/or locked (i.e., locking the bicycle) in response to instructions from the server 110 and/or the terminal device 130. In some embodiments, the lock 170 may include a locking mechanism, and the control component 420 may control the locking mechanism to move between a locking position and an unlocking position.

The positioning component 430 may communicate with the positioning device 160 of the security system 100 for locating or tracking a position of the device 140. The positioning component 430 may determine longitude information and/or latitude information associated with the device 140. The longitude information and/or the latitude information may be used for assisting maintenance workers to identify the device 140. The communication port 440 may facilitate communications among the device 140, the terminal device 130, and/or the server 110.

The communication port 440 may utilize various wireless technologies such as a cellular communication technology (e.g., GSM, CDMA, 2G, 3G, 4G), a short-range radio communication technology (e.g., Bluetooth, NFC, radio frequency identification (RFID), Zigbee), narrow band internet of things (NB-IoT), lower-power wide-area network (LPWAN) (e.g., LoRa), etc. The communication port 440 may include a communication port which may be configured to transmit information to the server 110 or the terminal device 140. In some embodiments, the control component 420, the positioning component 430, and/or the communication port 440 may be integrated into the lock 170.

The display 450 may display information relating to the device 140. For example, the device 140 may be a bicycle of a bicycle sharing system and the display 450 may display information relating to the bicycle when a user is riding the bicycle. The information may include a navigation map, a riding speed, a riding distance, etc. In some embodiments, the display 450 may also display advertisements, news, traffic, weather, etc. In some embodiments, the display 450 may provide an interactive interface for the user. For example, the user may select a navigation route from a plurality of routes shown on the display 450. The display 450 may include a liquid crystal display (LCD), a light emitting diode (LED)-based display, a flat panel display or curved screen, a television device, a cathode ray tube (CRT), or the like, or any combination thereof. In some embodiments, the display 450 may be integrated with the lock 170.

The power supply 460 may provide power for operations of components of the device 140 (e.g., the control component 420, the positioning component 430, the communication port 440, the display 450). The power supply 460 may include a battery charged by solar energy, kinetic energy (e.g., during a ride of the device 140, the battery may be charged), wind energy, mechanical energy, etc. In some embodiments, the device 140 may be a bicycle of a bicycle sharing system. The bicycle may include other components, for example, a moving component (e.g., a pedal, a wheel), a gearing component (e.g., a bicycle chain), an arresting component (e.g., a brake), an alarming component (e.g., a bell), or the like, or any combination thereof.

In some embodiments, the bicycle may further include a pressure acquisition device (not shown) installed on a handlebar or a saddle of the bicycle. The pressure acquisition device may be configured to detect pressure information associated with the bicycle. For example, the pressure acquisition device may include a first pressure acquisition device installed on a left handlebar, a second pressure acquisition device installed on a right handlebar, and a third pressure acquisition device installed on the saddle. According to a result of the determination that the first pressure within a predetermined period (e.g., 5 minutes) acquired by the first pressure acquisition device is less than a first threshold, a second pressure within the predetermined period acquired by the second pressure acquisition device is less than a second threshold, and a third pressure within the predetermined period acquired by the third pressure acquisition device is less than a third threshold, the bicycle may determine that the use of the bicycle may be ended and the control component 420 may lock the bicycle.

Figure 5:
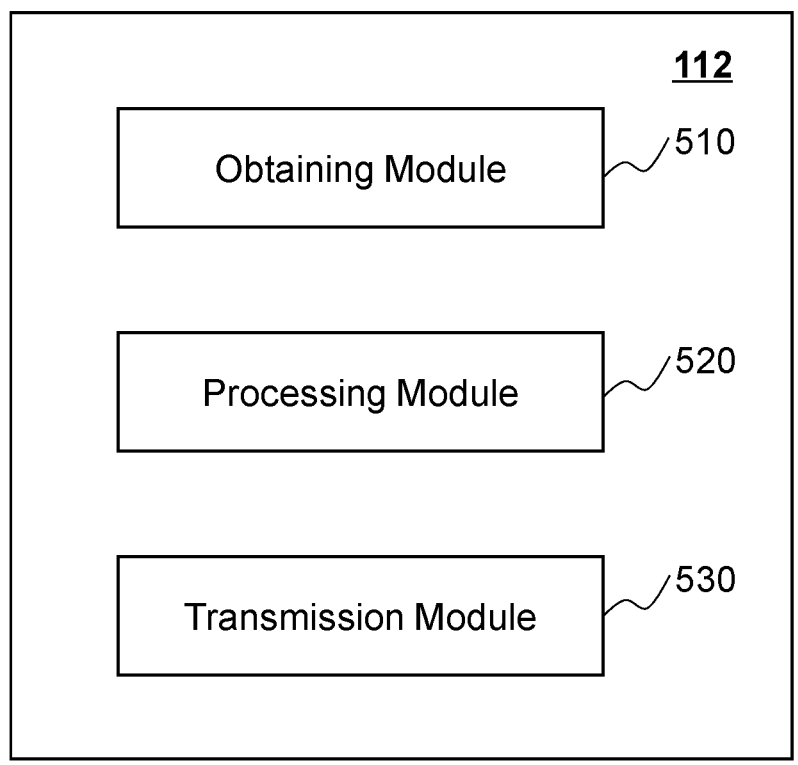
FIG. 5 is a block diagram illustrating an exemplary processing engine according to some embodiments of the present disclosure.

FIG. 5 is a block diagram illustrating an exemplary processing engine according to some embodiments of the present disclosure. The processing engine 112 may include an obtaining module 510, a processing module 520, and a transmission module 530.

The obtaining module 510 may be configured to obtain a service request and/or any information associated with the service request. The obtaining module 510 may obtain the service request from the terminal device 130 via the network 120. The service request may be a request associated with the device 140. In some embodiments, the device 140 may be a bicycle of a bicycle sharing system. The following descriptions may take an application scenario for bicycle sharing as an example, it should be noted that the present disclosure can be applied in any other application scenario. The service request may be a request for using a transportation service (e.g., a bicycle). The service request may include user information (e.g., a username, an identity card number, a user identity associated with the terminal device 130) associated with a requestor, bicycle identification information (e.g., a bicycle serial number) of the bicycle, etc.

In some embodiments, the obtaining module 510 may obtain service information associated with the service request. The service information may include lock information (e.g., lock identification information, a time point when the lock 170 is unlocked, a time point when the lock 170 is locked), a user identity associated with the terminal device 130, a start location associated with the service request, a destination associated with the service request, etc. In some embodiments, the service information may further include a travel time from the start location to the destination (or the location the user stops), a travel route associated with the start location and/or the destination, a predicted fee associated with the service request, etc.

In some embodiments, the obtaining module 510 may obtain user identification information associated with a requestor from an identification device (e.g., an identification device 900) in the lock 170. The identification information associated with the requestor may include integrated circuit (IC) card information, iris information, fingerprint information, etc. In some embodiments, the obtaining module 510 may further obtain maintenance information (e.g., power information, tire information, time information, noise information) associated with the bicycle.

The processing module 520 may be configured to process information and/or data associated with the service request, the identification information associated with the requestor, the maintenance information associated with bicycle, etc.

In some embodiments, the processing module 520 may determine and/or maintain a table (e.g., Table 1) indicating a relationship between bicycle serial numbers and lock serial numbers.

TABLE 1

An exemplary relationship between bicycle serial numbers and lock serial numbers

| Bicycle Serial Number | Lock Serial Number |
|---|---|
| JA546 | Lock001 |
| JA547 | Lock002 |
| . . . | . . . |

In some embodiments, the processing module 520 may further determine and/or maintain a table indicating a relationship between lock serial numbers and unlocking passwords. For example, as illustrated in Table 2, a specific lock serial number corresponds to a specific unlocking password.

TABLE 2

An exemplary relationship between lock serial numbers and unlocking passwords

| Lock Serial Number | Password |
|---|---|
| Lock001 | 135780 |
| Lock002 | 237051 |
| . . . | . . . |

As another example, as illustrated in Table 3, a specific lock serial number corresponds to a plurality of unlocking passwords.

TABLE 3

An exemplary relationship between lock serial numbers and unlocking passwords

| Lock Serial Number | Password |
|---|---|
| Lock001 | 12HJB3 |
|  | 89TYVD |
|  | 108YZ6 |
|  | GXY930 |
|  | . . . |
| Lock002 | 654321 |
|  | 120987 |
|  | . . . |
| . . . | . . . |

As yet another example, as illustrated in Table 4, for the plurality of unlocking passwords, the processing module 520 may define a plurality of valid periods respectively. As used herein, "valid period" refers to a period within which a corresponding password can be used to unlock the bicycle. The valid period may be default settings of the bicycle sharing system or may be adjustable in different situations.

TABLE 4

An exemplary relationship between passwords and valid periods

| Lock Serial Number | Password | Valid Period |
|---|---|---|
| Lock001 | 12HJB3 | 12:00-12:30 |
|  | 89TYVD | 12:30-13:00 |
|  | 108YZ6 | 13:00-13:30 |
|  | GXY930 | 13:30-14:00 |
| Lock002 | ... | ... |
| ... | ... | ... |

In some embodiments, after obtaining a service request, the processing module 520 may determine a reference unlocking password based on the bicycle identification information (e.g., the bicycle serial number) included in the service request. The processing module 520 may determine a specific lock serial number based on the bicycle serial number according to Table 1 and determine the reference unlocking password based on the specific lock serial number according to Table 2, Table 3, or Table 4. For example, the processing module 520 may determine the reference unlocking password corresponding to the specific lock serial number according to Table 2. As another example, according to Table 3, the processing module 520 may randomly select an unlocking password corresponding to the specific lock serial number as the reference unlocking password. As yet another example, according to Table 4, the processing module 520 may determine a valid period within which the service request is initiated and determine an unlocking password corresponding to the specific lock serial number based on the valid period as the reference unlocking password.

In some embodiments, the processing module 520 may further determine a relationship (e.g., Table 5) between requestors and unlocking passwords based on the user information (e.g., the user identity associated with the terminal device 130) included in the service request.

TABLE 5

An exemplary relationship between users and passwords

| Requestor | Password |
|---|---|
| Requestor 1 | 135780 |
| Requestor 2 | 237051 |
| ... | ... |

In some embodiments, when a service transaction associated with the service request is completed, the processing module 520 may update the relationship (e.g., Table 2, Table 3) between the lock serial numbers and the unlocking passwords. For example, assuming that the service request is associated with bicycle "JA546" corresponding to a lock serial number "Lock001." As illustrated in Table 2, when the service transaction associated with the service request is completed, the processing module 520 may delete the unlocking password "135780" (or mark the unlocking password "135780" as suspended or invalid) corresponding to the lock serial number "Lock001" and determine an updated unlocking password (e.g., "349062" illustrated in Table 6).

TABLE 6

An exemplary updated relationship between lock serial numbers and unlocking passwords

| Lock Serial Number | Password |
|---|---|
| Lock001 | 349062 |
| Lock002 | 237051 |
| ... | ... |

As another example, also assuming that the service request is associated with bicycle "JA546" corresponding to the lock serial number "Lock001." As illustrated in Table 3, when the service transaction associated with the service request is completed, the processing module 520 may delete the unlocking password "12HJB3" (or mark the unlocking password "12HJB3" as suspended or invalid) corresponding to the lock serial number "Lock001" and update the relationship between lock serial numbers and unlocking passwords as illustrated in Table 7. In this example, when all unlocking passwords corresponding to a specific lock serial number are deleted (or marked as suspended or invalid), the processing module 520 may determine and/or maintain a new table indicating the relationship between lock serial numbers and unlocking passwords.

TABLE 7

An exemplary updated relationship between lock serial numbers and unlocking passwords

| Lock Serial Number | Password |
|---|---|
| Lock001 | 89TYVD |
|  | 108YZ6 |
|  | GXY930 |
|  | ... |
| Lock002 | 654321 |
|  | 120987 |
|  | ... |
| ... | ... |

In some embodiments, the processing module 520 may update the relationship between the serial numbers and the unlocking passwords. In some embodiments, the processing module 520 may update the relationship periodically. For example, as illustrated in Table 4, for a specific lock serial number, an unlocking password corresponds to a valid period. The plurality of valid periods may be determined by segmenting a cycle period (e.g., 2 hours). At the end of the cycle period, the processing module 520 may determine a group of updated unlocking passwords.

In some embodiments, during the ride process associated with the service request and/or after the service transaction associated with the service request is completed, the processing module 520 may determine billing information based on the service information associated with the service request.

In some embodiments, the processing module 520 may analyze the user identification information (e.g., the IC card information, the iris information, the fingerprint information) associated with the requestor and determine an unlocking instruction based on the analysis result. For example, the processing module 520 may compare the fingerprint information with reference fingerprint information that has been registered to the bicycle sharing system. According to a result of the determination that the fingerprint information is consistent with the reference fingerprint information, the processing module 520 may determine an unlocking instruction. According to a result of the determination that there is no corresponding reference fingerprint information which is consistent with the fingerprint information, the processing module 520 may generate a notification to notify the requestor to register to the bicycle sharing system.

In some embodiments, the processing module 520 may process the maintenance information and determine whether the bicycle needs repair. For example, the processing module 520 may determine whether the residual capacity of the power supply 460 is lower than a threshold. According to a result of the determination that the residual capacity is lower than the threshold, the processing module 520 may provide a notification to notify a maintenance worker to detect the power supply 460. As another example, the processing module 520 may compare the time information associated with the bicycle with standard time information and calibrate the timing in the bicycle.

The transmission module 530 may be configured to transmit information and/or data associated with the service request, the user identification information, and/or the maintenance information to the bicycle and/or the terminal device 130. The transmission module 530 may transmit the information and/or data via one or more messages using any suitable communication protocol (e.g., the Hypertext Transfer Protocol (HTTP), Address Resolution Protocol (ARP), Dynamic Host Configuration Protocol (DHCP), File Transfer Protocol (FTP)).

In some embodiments, the transmission module 530 may transmit a reference unlocking password corresponding to the service request to the terminal device 130.

In some embodiments, the transmission module 530 may transmit one or more unlocking passwords to the bicycle (e.g., the lock 170) to be stored according to Tables 1-4 and 6-7. For example, as described in connection with Table 2 and Table 6, when a prior service transaction associated with a prior service request is completed, the processing module 520 may update the relationship between the lock serial numbers and the unlocking passwords. Further, the transmission module 530 may transmit the updated unlocking password to the bicycle. As another example, as described in connection with Table 3 and Table 7, when all prior unlocking passwords are deleted or marked as invalid, the processing module 520 may determine and/or maintain a new table indicating the relationship between lock serial numbers and unlocking passwords. Further, the transmission module 530 may transmit the updated unlocking passwords corresponding to the bicycle to the bicycle. As a further example, as described in connection with Table 4, the processing module 520 may periodically update the relationship between the lock serial numbers and unlocking passwords. Further, the transmission module 530 may periodically transmit the updated unlocking passwords to the bicycle.

In some embodiments, the transmission module 530 may transmit the billing information to the terminal device 130.

In some embodiments, the transmission module 530 may transmit an unlocking instruction to the bicycle. For example, according to a result of the determination that the fingerprint information is consistent with the reference fingerprint information, the transmission module 530 may transmit the unlocking instruction to the lock 170.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the obtaining module 510 and the transmission module 530 may be combined into a single module which may both obtain a service request from the terminal device 130 and transmit information and/or data (e.g., the reference unlocking password, the billing information) associated with the service request to the terminal device 130. As another example, the processing engine 112 may include a storage module (not shown) used to store information and/or data (e.g., the bicycle identification information, the relationships among bicycle serial numbers, lock serial numbers, and/or unlocking passwords) associated with the service request(s).

Figure 6:
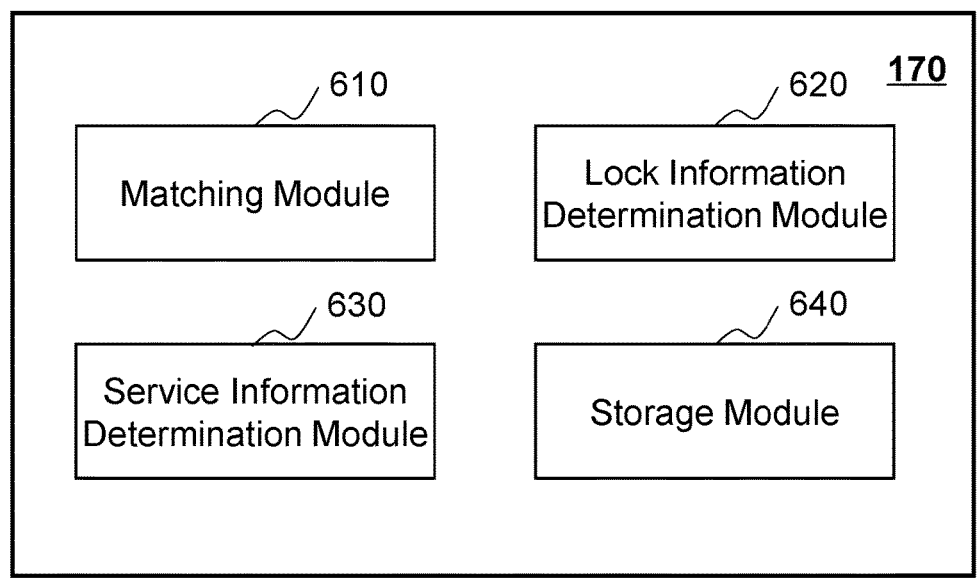
FIG. 6 is a block diagram illustrating an exemplary lock according to some embodiments of the present disclosure.

FIG. 6 is a block diagram illustrating an exemplary lock according to some embodiments of the present disclosure. The lock 170 may include a matching module 610, a lock information determination module 620, a service information determination module 630, and a storage module 640.

The matching module 610 may be configured to determine whether an input obtained from the terminal device 130 satisfies an unlocking condition. In some embodiments, the matching module 610 may determine whether a password included in the input from the user (via the terminal device 130 or an input device of the bicycle) is consistent with a pre-stored password in the bicycle (e.g., the lock 170). As described in connection with FIG. 5, the transmission module 530 may transmit one or more unlocking passwords to the bicycle. The one or more unlocking passwords may be stored in a storage device (e.g., the storage module 640) in the lock 170.

In some embodiments, as illustrated in Table 2 and Table 6, the bicycle may pre-store one password. The matching module 610 may match the password included in the input with the pre-stored password. According to a result of the determination that the password included in the input is consistent with the pre-stored password in the bicycle, the control component 420 may actuate the lock 170 to unlock the bicycle.

In some embodiments, as illustrated in Table 3 and Table 7, the bicycle may pre-store a plurality of candidate passwords. The matching module 610 may match the password included in the input with the plurality of candidate passwords respectively. According to a result of a determination that the password included in the input is consistent with one of the plurality of candidate passwords, the control component 420 may actuate the lock 170 to unlock the bicycle.

In some embodiments, as illustrated in Table 4, the bicycle may pre-store a plurality of candidate passwords corresponding to a plurality of valid periods. The matching module 610 may determine a time point (e.g., 12:10) when the input is obtained and identify a target unlocking password corresponding to a valid period (e.g., 12:00-12:30) including the time point. Further, the matching module 610 may compare the password included in the input with the target unlocking password and according to a result of the determination that the password included in the input is consistent with the target unlocking password in the bicycle, the control component 420 may actuate the lock 170 to unlock the bicycle.

In some embodiments, according to a result of the determination that the password included in the input is not consistent with the pre-stored password in the bicycle, the matching module 610 may provide a notification to the terminal device 130 to notify the requestor that there may be an error in the input. For example, the matching module 610 may transmit a message to the terminal device 130. As another example, the matching module 610 may provide a popup notification via an application installed on the terminal device 130. As a further example, the matching module 610 may actuate the display 450 to display a tip screen (e.g., a highlight, a twinkling). As a still further example, the matching module 610 may actuate an audio device (not shown) on the bicycle to provide an audio notice.

The lock information determination module 620 may be configured to determine lock information associated with the service request. The lock information may include lock identification information (e.g., a lock serial number), a time point when the lock 170 is unlocked (also referred to as an "unlocking time point"), a time point when the lock 170 is locked (also referred to as a "locking time point"), etc.

In some embodiments, the lock information determination module 620 may determine the unlocking time point and the locking time point by a clock (not shown) integrated into the lock 170. In some embodiments, the lock information may further include the bicycle identification information (e.g., the bicycle serial number), basic information (e.g., bicycle type, bicycle age), maintenance information (e.g., power information) associated with the bicycle, etc.

The service information determination module 630 may be configured to determine service information based on the lock information. The service information may include the lock information, a user identity associated with the terminal device 130, a start location associated with the service request, a destination associated with the service request, etc. In some embodiments, the service information may further include a travel time from the start location to the destination (or the location the user stops), a travel route associated with the start location and/or the destination, a predicted fee associated with the service request, etc.

In some embodiments, the service information determination module 630 may further transmit the service information to the server 110. In some embodiments, the service information determination module 630 may determine whether a connection between the bicycle and the server 110 is established. According to a result of the determination that the connection is not established, the service information determination module 630 may store the service information in the bicycle, and when the connection is established, the service information determination module 630 may transmit the service information to the server 110.

The storage module 640 may be configured to store any information and/or data associated with the service request, the lock information, the service information, etc. In some embodiments, the storage module 640 may store the unlocking password(s) obtained from the server 110. For example, as described in connection with FIG. 5, the transmission module 530 may transmit one or more unlocking passwords to the lock 170. The one or more unlocking passwords may be stored in the storage module 640. In some embodiments, the storage module 640 may store the service information based on a result of the determination that the connection between the bicycle and the server 110 is not established.

The modules in the lock 170 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the lock information determination module 620 and the service information determination module 630 may be combined into a single module which may both determine the lock information and the service information.

Figure 7:
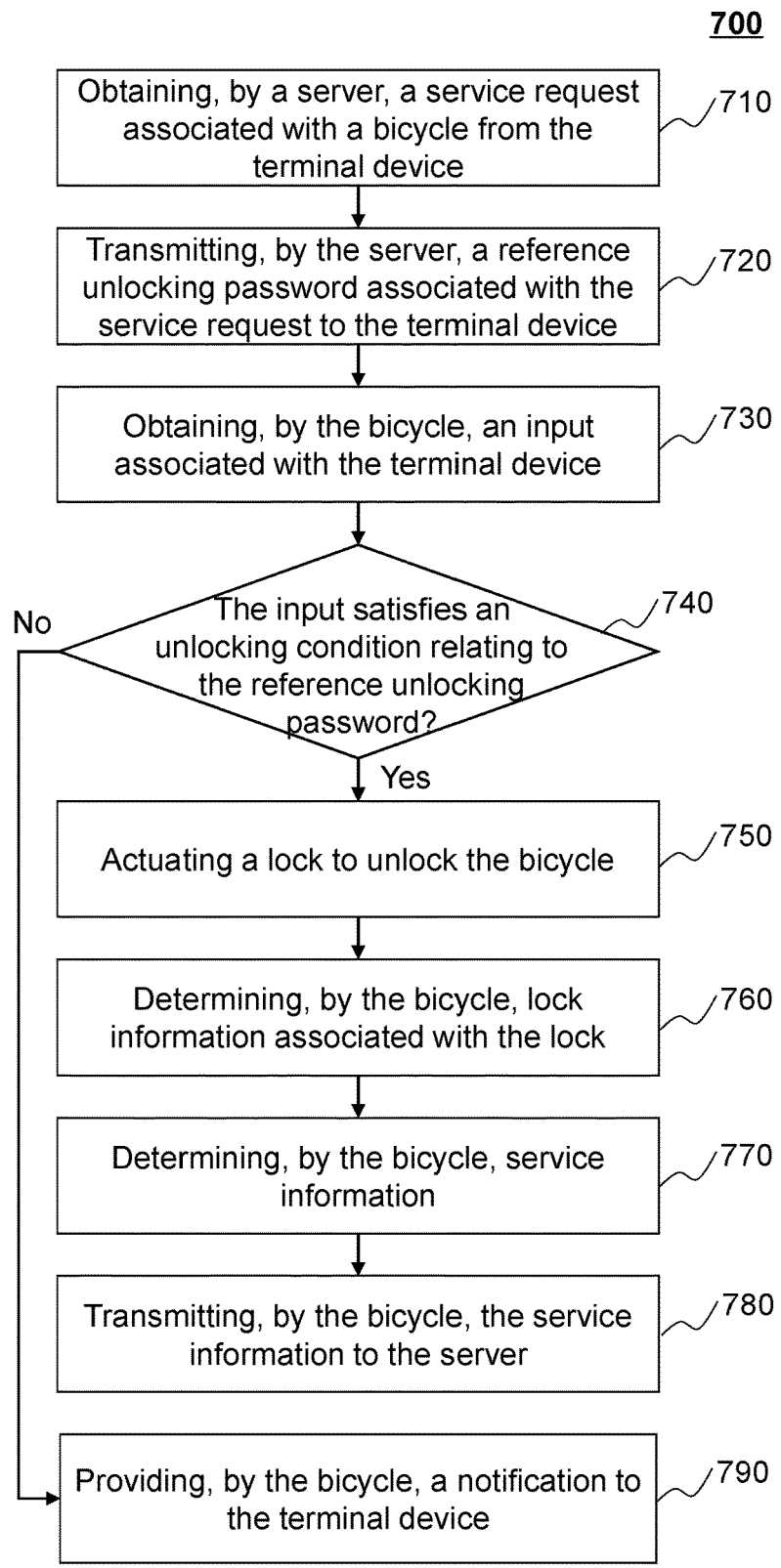
FIG. 7 is a flowchart illustrating an exemplary process for unlocking a lock according to some embodiments of the present disclosure.

FIG. 7 is a flowchart illustrating an exemplary process for unlocking a bicycle according to some embodiments of the present disclosure. In some embodiments, the process 700 may be executed by the bicycle sharing system. For example, the process 700 may be implemented as a set of instructions (e.g., an application) stored in the ROM 230 or the RAM 240. The processor 220 and/or the modules in FIG. 5 or FIG. 6 may execute the set of instructions and, when executing the instructions, it may be configured to perform the process 700. The operations of the illustrated process 700 presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

In 710, the server 110 (e.g., the obtaining module 510 in the processing engine 112) may obtain a service request associated with a bicycle (e.g., the bicycle) from the terminal device 130 via the network 120. The service request may be a request for using a transportation service associated with the bicycle. The service request may include user information (e.g., a username, an identity card number, a user identity associated with the terminal device 130) associated with a requestor, bicycle identification information (e.g., a bicycle serial number) of the bicycle, etc.

In some embodiments, the requestor may initiate the service request by scanning an identity code (e.g., a QR code, a barcode) on the bicycle (e.g., a handlebar, frame, or lock) via the terminal device 130. The terminal device 130 may obtain the bicycle identification information according to the identity code. The terminal device 130 may also transmit the service request including the bicycle identification information to the server 110. In some embodiments, the requestor may manually input the bicycle identification information (e.g., the bicycle serial number) via the terminal device 130. The terminal device 130 may generate a service request including the bicycle identification information and transmit the service e request to the server 110 via the network 120.

In some embodiments, the requestor may initiate the service request via a wireless connection between the terminal device 130 and the bicycle. The wireless connection may include a short-range communication such as a Bluetooth connection, a ZigBee connection, a hotspot connection, a WiFi connection, or the like, or a combination thereof. For example, the bicycle (e.g., the communication port 440 in the lock 170) may broadcast a wireless signal within a predetermined range (e.g., a range within a certain radius (e.g., 5 m, 10 m, 20 m, 100 m, 500 m, 1 km) from the bicycle. The terminal device 130 within the range may detect the wireless signal and establish the wireless connection between the terminal device 130 and the bicycle. After establishing the wireless connection, the terminal device 130 may obtain the bicycle identification information (e.g., the bicycle serial number) of the bicycle and transmit the service request including the bicycle identification information to the server 110 via the network 120.

In some embodiments, when the requestor intends to initiate a service request, there may be a plurality of bicycles nearby. As used herein, "nearby" refers to that a distance between a bicycle and the terminal device 130 is less than a threshold (e.g., 10 m, 50 m, 100 m, 500 m). In this situation, the plurality of bicycles may broadcast a plurality of wireless signals. The terminal device 130 may determine a plurality of intensities of the plurality of wireless signals and accordingly determine a plurality of distances between the bicycles and the terminal device 130 based on the intensity of the individual signals. For example, the higher the intensity is, the shorter the distance between the bicycle and the terminal device 130 may be. The terminal device 130 may identify one or more bicycles with distance(s) less than a threshold (e.g., 8 m, 10 m). The terminal device 130 may automatically select one (e.g., one with the shortest distance, a random one) from the one or more bicycles. Alternatively or additionally, the user may select one from the one or more bicycles displayed on the terminal device 130. The terminal device 130 may also establish the wireless connection between the selected bicycle and the terminal device 130.

In some embodiments, after the wireless connection between the bicycle and the terminal device 130 is established, the bicycle may specify a connection permission associated with the wireless signal. Under the connection permission, any other terminal device cannot establish a wireless connection with the bicycle.

In some embodiments, the bicycle may include an ON/OFF switch (e.g., an ON/OFF button) for turning on or off the wireless signal on the bicycle. When a period within which no terminal device establishes a wireless connection with the bicycle is larger than a threshold (e.g., 30 minutes, 1 hour, 2 hours), the bicycle may set the mode of the bicycle (e.g., the lock 170) to a dormant mode. When a requestor intends to initiate a service request, the requestor may put the ON/OFF switch to the ON position, and the wireless connection between the terminal device 130 and the bicycle may be established.

In 720, the server 110 (e.g., the transmission module 530 in the processing engine 112) may transmit a reference unlocking password associated with the service request to the terminal device 130. For example, the server 110 may transmit a reference unlocking password to the terminal device 130 via the network 120.

In some embodiments, the server 110 (e.g., the processing module 520 in the processing engine 112) may determine the reference unlocking password to be transmitted to the terminal device 130 according to the bicycle identification information (e.g., the bicycle serial number) included in the service request. The server 110 may determine the lock serial number based on the bicycle serial number (e.g., according to Table 1) and determine the reference unlocking password based on the lock serial number (e.g., according to Table 2, Table 3, or Table 4). For example, the server 110 may determine the reference unlocking password corresponding to the specific lock serial number according to Table 2. Alternatively or additionally, according to Table 3, the server 110 may randomly select an unlocking password corresponding to the specific lock serial number as the reference unlocking password. Alternatively or additionally, according to Table 4, the server 110 may determine a valid period within which the service request is initiated and determine an unlocking password corresponding to the lock serial number based on the valid period as the reference unlocking password.

In 730, the bicycle (e.g., the matching module 610 in the lock 170) may obtain an input associated with the terminal device 130. As used herein, the input may refer to a manual input from a requestor, an instruction from the terminal device 130, etc. For example, the bicycle may obtain a manual input including a password by the requestor via the terminal device 130 or an input device (e.g., a keyboard, a virtual keyboard) on the bicycle. As another example, the bicycle may obtain an unlocking instruction including a password from the terminal device 130 via the wireless connection between the bicycle and the terminal device 130.

In 740, the bicycle (e.g., the matching module 610 in the lock 170) may determine whether the input satisfies an unlocking condition relating to the reference unlocking password. For example, the bicycle may determine whether the password included in the input is consistent with a pre-stored password in the bicycle. If the bicycle determines that the password included in the input is consistent with the pre-stored password in the bicycle, the bicycle may determine that the input satisfies the unlocking condition. On the other hand, if the bicycle determines that the password included in the input is inconsistent with the pre-stored password in the bicycle, the bicycle may determine that the input does not satisfy the unlocking condition. The pre-stored password may be obtained from the server 110. For example, the bicycle (e.g., the matching module 610) may receive the password from the server 110 via the network 120 and store the password in its storage device.

In some embodiments, as described in connection with Table 2 and Table 6, when a prior service transaction associated with a prior service request is completed, the server 110 may generate (or determine) an updated unlocking password and transmit the updated unlocking password to the bicycle to be stored via, for example, the network 120. The bicycle may determine whether the password included in the input in a next transaction is consistent with the updated password obtained from the server 110.

In some embodiments, as described in connection with Table 3 and Table 7, the server 110 may transmit a plurality of candidate passwords to the bicycle. The bicycle may determine whether the password included in the input from the user (via the terminal device 130 or an input device of the bicycle) is consistent with one of the plurality of candidate passwords obtained from the server 110.

In some embodiments, as described in connection with Table 4, the bicycle may pre-store a plurality of candidate passwords, which correspond to a plurality of valid periods. The bicycle may determine a time point (e.g., 12:10) when the input is obtained and identify a target unlocking password corresponding to a valid period (e.g., 12:00-12:30) including the time point. Further, the bicycle may determine whether the password included in the input is consistent with the target unlocking password.

According to a result of the determination that the input does not satisfy the unlocking condition, the bicycle (e.g., the matching module 610 in the lock 170) in 790 may provide a notification to the terminal device 130 to notify the requestor that there may be an error. For example, the bicycle may transmit a message indicating "password may be wrong" to the terminal device 130. Alternatively or additionally, the bicycle may actuate the display 450 to display a tip screen (e.g., a highlight, a twinkling). Alternatively or additionally, the bicycle may actuate an audio device (not shown) on the bicycle to provide an audio notice.

According to a result of the determination that the input satisfies the unlocking condition, the bicycle (e.g., the control component 420) in 750 may actuate the lock 170 to unlock the bicycle. For example, the matching module 610 may generate an unlocking instruction and transmit the unlocking instruction to the control component 420. The control component 420 may control the lock 170 to unlock the bicycle. After the bicycle is unlocked, the bicycle and the terminal device 130 may be paired, and other terminal devices cannot establish any connection with the bicycle until a service transaction associated with the service request is completed or the connection between the terminal device 130 and the bicycle is terminated.

In some embodiments, as described in connection with Table 2 and Table 6, according to a result of the determination that the input satisfies the unlocking condition, the bicycle may delete the pre-stored password or mark the password as invalid or suspended. After a service transaction associated with the service request is completed, the server 110 may transmit an updated password to the bicycle to be stored for a next service request.

In some embodiments, as described in connection with Table 3 and Table 7, according to a result of the determination that the input satisfies the unlocking condition, the bicycle may delete a specific candidate password that is consistent with the password included in the input or mark the specific candidate password as invalid or suspended. After one or more (or all) candidate unlocking passwords in the bicycle are deleted or marked as invalid or suspended, the server 110 may transmit a plurality of updated candidate passwords to the bicycle to be stored.

In some embodiments, as described in connection with Table 4, according to a result of the determination that the input satisfies the unlocking condition, the bicycle may delete the target unlocking password with the valid period including the time point when the input is obtained or mark the target unlocking password as invalid or suspended.

In 760, the bicycle (e.g., the lock information determination module 620) may determine lock information associated with the lock 170. The lock information may include lock identification information (e.g., a lock serial number), a time point when the lock 170 is unlocked, a time point when the lock 170 is locked, etc. In some embodiments, the lock information may further include the bicycle identification information (e.g., the bicycle serial number), basic information (e.g., bicycle type, bicycle age), maintenance information (e.g., power information) associated with the bicycle, etc.

In 770, the bicycle (e.g., the service information determination module 630) and/or the terminal device 130 may determine service information. The service information may include the lock information, a user identity associated with the terminal device 130, a start location associated with the service request, a destination associated with the service request, etc. The bicycle may determine the start location and/or the destination by the positioning component 430. The terminal device 130 may determine the start location and/or the destination by a GPS device of the terminal device 130. In some embodiments, the service information may further include a travel time from the start location to the destination (or the location the user stops), a travel route associated with the start location and/or the destination, a predicted fee associated with the service request, etc.

In 780, the bicycle (e.g., the service information determination module 630 or the communication port 440) and/or the terminal device 130 may transmit the service information to the server 110. In some embodiments, when the lock 170 is unlocked, the bicycle and/or the terminal device 130 may transmit start service information (e.g., the time point when the lock 170 is unlocked, the lock identification information, the start location associated with the service request, the user identity associated with the terminal device 130) to the server 110. After receiving the start service information, the server 110 (e.g., the processing module 520) may monitor the transportation service (e.g., monitor a timing of the transportation service) until a service transaction associated with the service request is completed.

In some embodiments, when the service transaction associated with the service request is completed, the bicycle and/or the terminal device 130 may transmit end service information (e.g., the time point when the lock 170 is locked, the destination associated with the service request, the lock identification information, the user identity associated with the terminal device 130) to the server 110. After receiving the end service information, the server 110 may stop the monitoring of the transportation service (e.g., stop the timing) and determine billing information based on the start service information and the end service information. Further, the server 110 (e.g., the transmission module 530) may transmit the billing information to the terminal device 130.

In some embodiments, when the bicycle intends to transmit the service information to the server 110, the bicycle may determine whether a connection between the bicycle and the server 110 is established. According to a result of the determination that the connection is not established, the bicycle may store the service information in a storage device (e.g., the storage module 640) in the bicycle, and when the connection is established, the bicycle may transmit the service information to the server 110.

In some embodiments, the server 110 may identify a location where the bicycle transmits the service information to the server 110 and determine a signal blind area based on the location and the destination associated with the service request. For example, if the destination of the service request is location A the bicycle or the terminal device 130 transmits the service information to the server 110 at location B, the server may determine that an area including location A and location B (or an area from location A to location B) where the communication signal may be weak and determine such area as a signal blind area. The server 110 may also determine a signal blind map based on a plurality of signal blind areas associated with a plurality of service requests. The signal blind map may be used to assist maintenance workers to carry out maintenance work.

In some embodiments, the service information may be determined by the terminal device 130. For example, after determining the lock information, the bicycle may transmit the lock information to the terminal device 130 via the wireless connection between the bicycle and the terminal device 130. The terminal device 130 may determine the service information based on the lock information and transmit the service information to the server 110.

In some embodiments, due to an accidental fault (e.g., network fault, bicycle fault, server fault), after the lock 170 is locked (i.e., the service associated with the service request is completed), the billing process may be still not terminated. In this situation, the requestor may manually end the billing process or provide a feedback associated with the fault by, for example, contacting the customer service. When the fault is solved, the server 110 may return extra fee (if any) to a user account of the requestor or provide a fee compensation (e.g., a discount coupon) to the user account.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 700. In the storing step, any information and/or data (e.g., the reference unlocking password, the lock information, the service information) associated with the service request may be stored in a storage device (e.g., the storage 390) disclosed elsewhere in the present disclosure. As another example, in 780, the bicycle may transmit the service information to the terminal device 130. As a further example, when the requestor initiates the service request via the wireless connection with between the terminal device 130 and the bicycle, the terminal device 130 may obtain maintenance information (e.g., power information, time information, tire information, noise information) associated with the bicycle via the wireless connection and transmit the maintenance information included in the service request to the server 110.

Figure 8:
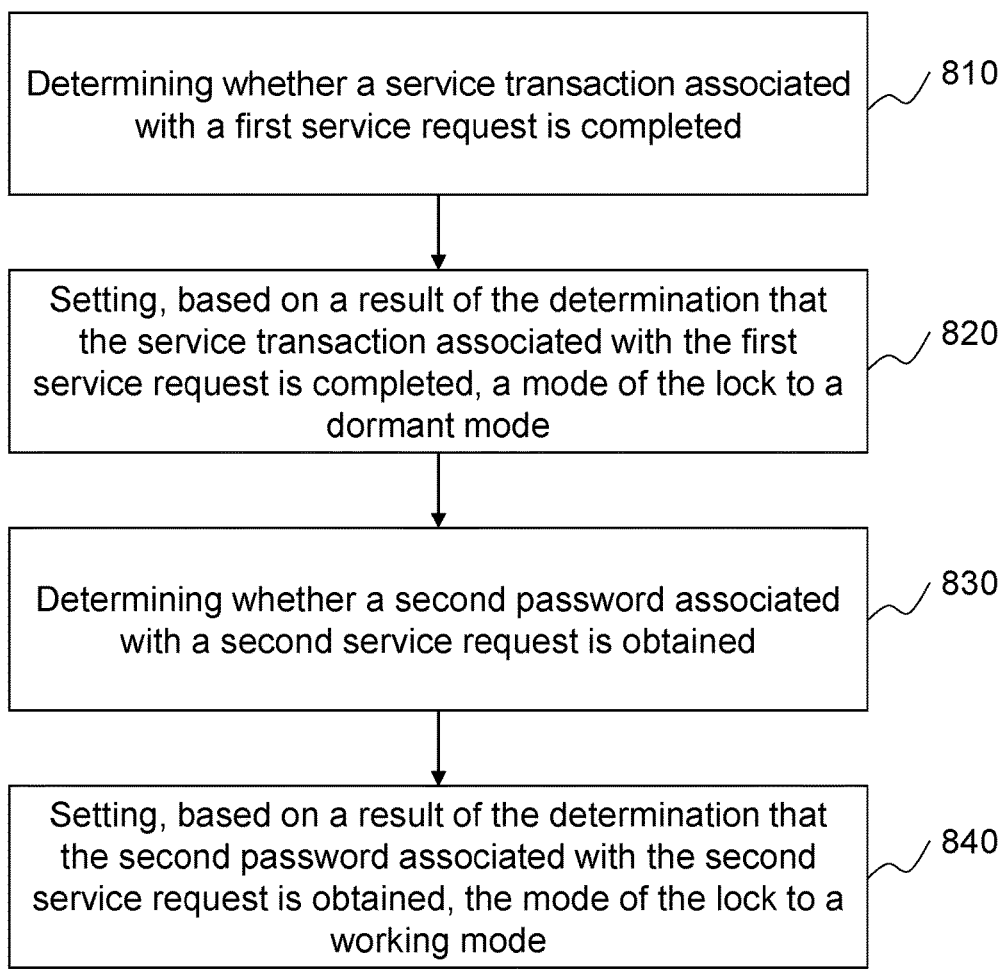
FIG. 8 is a flowchart illustrating an exemplary process for setting a mode of the lock according to some embodiments of the present disclosure.

FIG. 8 is a flowchart illustrating an exemplary process for switching modes of the lock according to some embodiments of the present disclosure. In some embodiments, the process 800 may be implemented as a set of instructions (e.g., an application) stored in the ROM 230 or the RAM 240. The processor 220 may execute the set of instructions and, when executing the instructions, it may be configured to perform the process 800. The operations of the illustrated process 800 presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting.

In 810, the bicycle (e.g., a mode determination module (not shown) in the lock 170) may determine whether a first service transaction associated with a first service request is completed. For example, when the requestor stops the bicycle and locks the lock 170, the bicycle may determine that a first service transaction associated with the first service request has been completed.

In 820, according to a result of the determination that the first service transaction associated with the first service request is completed, the bicycle (e.g., the mode determination module) may set the mode of the lock 170 to a dormant mode. As used herein, the dormant mode refers to a mode in which the lock does not work (i.e., does not communicate with the server 110 and/or the terminal device 130). For example, as described in connection with FIG. 7, when the first service transaction associated with the first service request is completed, the bicycle may obtain one or more unlocking passwords which may be used for subsequent service request(s) from the server 110. After receiving the one or more unlocking passwords, the bicycle may set the mode to the dormant mode.

In 830, the bicycle (e.g., the mode determination module) may determine whether a second password associated with a second service request is obtained. As described in connection with step 730, the bicycle may obtain the second password associated with the second service request from the terminal device 130 or an input device on the bicycle.

In 840, according to a result of the determination that the second password associated with the second service request is obtained, the bicycle (e.g., the mode determination module) may set the mode of the lock 170 to a working mode. In the working mode, the bicycle may determine whether the second password is consistent with a pre-stored password in the bicycle. According to a result of the determination that the second password is consistent with the pre-stored password, the bicycle may actuate the lock 170 to unlock the bicycle.

In some embodiments, the bicycle may determine the start lock information (e.g., the time point when the lock 170 is unlocked) and determine the start service information based on the start lock information. After determining the start service information, the bicycle may set the mode of the lock 170 to the dormant mode. When the lock 170 is locked (i.e., the second service transaction associated with the second service request is completed), the bicycle may set the mode of the lock 170 back to the working mode. The bicycle may determine the end lock information (e.g., the time point when the lock 170 is locked). The bicycle may also determine the end start service information based on the end lock information. After determining the end service information, the bicycle may transmit the start service information and/or the end service information to the server 110, indicating that the second service transaction associated with the second service request is completed. The bicycle may execute the process 800 back to step 820 to set the mode of the lock 170 to the dormant mode.

In some embodiments, when the lock 170 is in the dormant mode and no next password associated with a next service request is obtained, the bicycle may set the mode of the lock 170 to the working mode at a target time point, wherein the target time point is a time point after a predetermined time interval (e.g., 30 minutes, 1 hour, 2 hours) from a time point when the mode of the lock 170 is set as the dormant mode.

It should be noted that the above description of the mode switching process is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, step 810 and step 820 may be combined into a single step in which the bicycle may both determine whether the first service transaction associated with the first service request is completed and set the mode of the lock 170 to the dormant mode based on a result of the determination that the first service transaction associated with the first service request is completed. As another example, step 830 and step 840 may be combined into a single step in which the bicycle may both determine whether a second password associated with a second service request is obtained and set the mode of the lock 170 to the working mode based on a result of the determination that the second password associated with the second service request is obtained.

Figure 9:
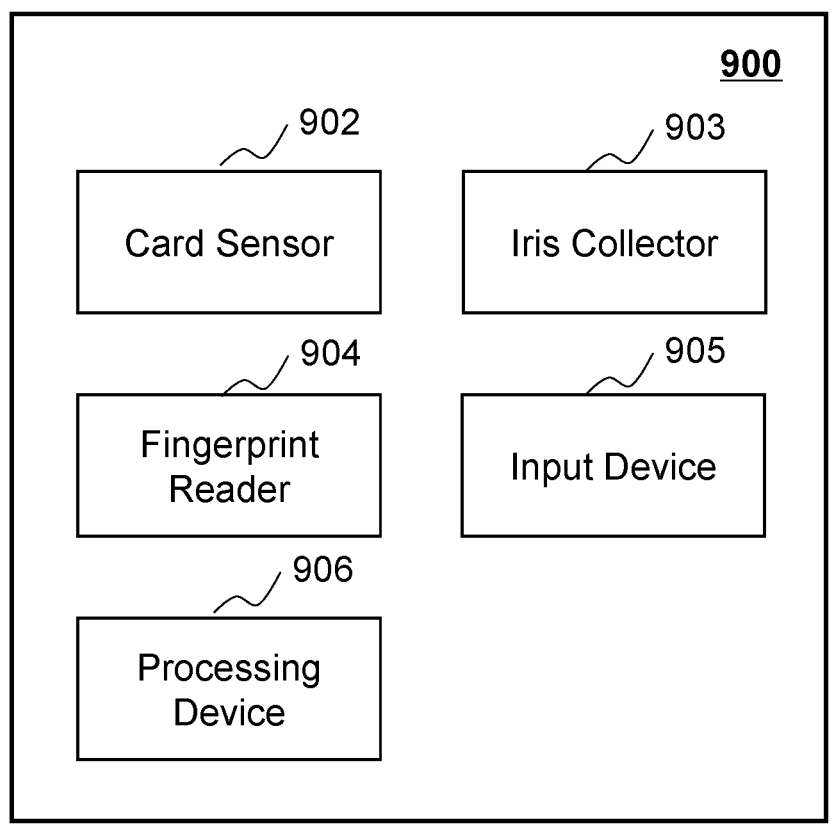
FIG. 9 is a block diagram illustrating an exemplary identification device according to some embodiments of the present disclosure.

FIG. 9 is a block diagram illustrating an exemplary identification device according to some embodiments of the present disclosure. In some embodiments, the identification device 900 may be integrated into the bicycle (e.g., the lock 170). The identification device 900 may include a card sensor 902, an iris collector 903, a fingerprint reader 904, an input device 905, and/or a processing device 906.

The card sensor 902 may be configured to collect card information associated with a requestor. In some embodiments, the card sensor 902 may include a near field detector (not shown) and a magnetic card reader (not shown). When the near field detector determines that a card (e.g., a bank card, an access card, a bus card, an identity card, an identification card, an integrated circuit card) is positioned nearby the bicycle (e.g., the lock 170), the magnetic card reader may identify the card and extract the card information from the card. As used herein, "nearby" refers to that a distance between the card and the bicycle (e.g., the lock 170) is less than a distance threshold (e.g., 1 mm, 2 mm, 5 mm, 1 cm, 2 cm). The card information may include card identification information (e.g., a card serial number), a validity period, a card issuing institution, user information associated with the card (e.g., real name, ID number, telephone number), etc. In some embodiments, the card sensor 902 may include a photodiode-based scanner, a laser scanner, a CCD reader, a camera-based reader, etc. The iris collector 903 may be configured to collect iris information associated with a requestor. The iris collector 903 may include an image acquisition device (not shown), an image processing device (not shown), etc.

The fingerprint reader 904 may be configured to collect fingerprint information associated with a requestor. The fingerprint reader 904 may include an optical fingerprint sensor, a semiconductor capacitance transducer, a semiconductor thermistor sensor, a semiconductor pressure sensor, an ultrasonic sensor, a radio frequency fingerprint sensor, etc.

The input device 905 may be configured to receive an input including identification information associated with a requestor. The identification information associated with the requestor may include the card information, the iris information, the fingerprint information, and/or any other unique identification (e.g., face identification information, passport number, driving license) associated with the requestor. In some embodiments, the input device 905 may include a keyboard, a touchscreen, a voice recognition device, etc.

The processing device 906 may be configured to process the identification information associated with the requestor and determine whether the requestor has permission to use the bicycle based on the identification information. In some embodiments, the processing device 906 may obtain reference identification information from a storage device (e.g., the storage 150) disclosed elsewhere in the present disclosure and compare the identification information with the reference identification information. The reference identification information may include reference card information that has been registered with the bicycle sharing system, reference iris information that has been registered to the bicycle sharing system, reference fingerprint information that has been registered to bicycle sharing the system 100, etc.

For example, the processing device 906 may compare the card information with the reference card information and determine whether the card information is consistent with the reference card information. According to a result of the determination that the card information is consistent with the reference card information, the processing device 906 may determine that the requestor has permission to use the bicycle. As another example, the processing device 906 may compare the iris information with the reference iris information and determine whether the iris information is consistent with the reference iris information. According to a result of the determination that the iris information is consistent with the reference iris information, the processing device 906 may determine that the requestor has permission to use the bicycle. As a further example, the processing device 906 may compare the fingerprint information with the reference fingerprint information and determine whether the fingerprint information is consistent with the reference fingerprint information. According to a result of the determination that the fingerprint information is consistent with the reference fingerprint information, the processing device 906 may determine that the requestor has permission to use the bicycle. Alternatively or additionally, the identification information may be transmitted to the server 110 via the communication port 440 to be processed. The server 110 may compare the identification information with the reference information and according to a result of the determination that the identification information is consistent with the reference information, the server 110 may determine that the requestor has permission to use the bicycle. The server 110 may also transmit the information indicating the requestor's permission to use the bicycle to the bicycle.

After determining that the requestor has permission to use the bicycle, the processing device 906 may generate an unlocking instruction and transmit the unlocking instruction to the control component 420. The control component 420 may actuate the lock 170 to unlock the bicycle based on the unlocking instruction.

In some embodiments, the identification device 900 may further include an encoding device (not shown) which may be used to encode the identification information. For example, the encoding device may encode the identification information as electronic signals and transmit the electronic signals to the server 110.

The modules in the identification device 900 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the identification device 900 may include a storage device (not shown) which may be used to store the obtained identification information and the reference identification information.

Figure 10:
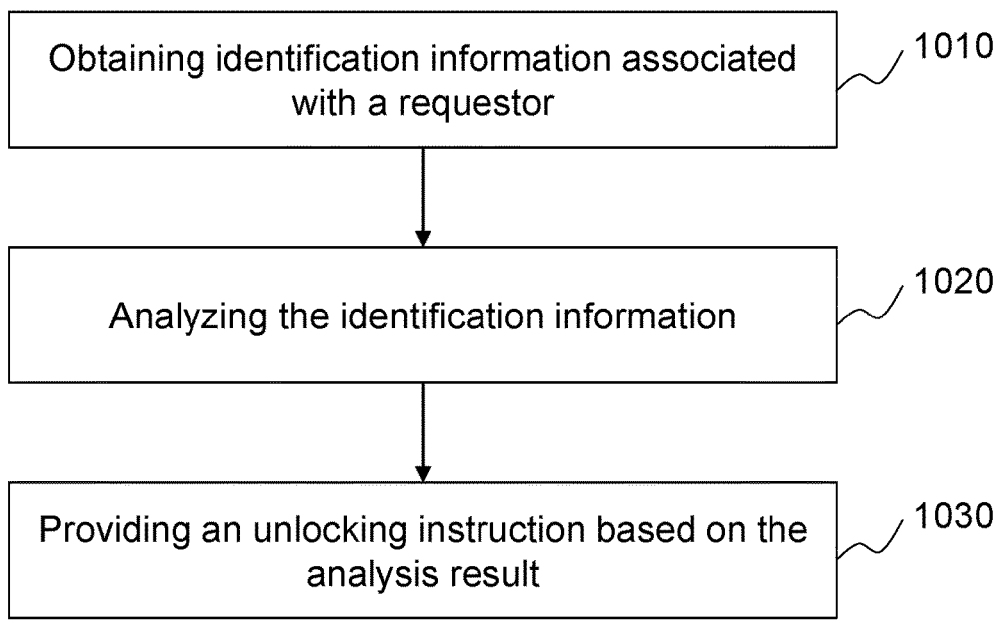
FIG. 10 is a flowchart illustrating an exemplary process for unlocking a lock according to some embodiments of the present disclosure.

FIG. 10 is a flowchart illustrating an exemplary process for determining an unlocking instruction based on identification information according to some embodiments of the present disclosure. In some embodiments, the process 1000 may be executed by the bicycle sharing system. For example, the process 1000 may be implemented as a set of instructions (e.g., an application) stored in the ROM 230 or the RAM 240. The processor 220 and/or the modules in FIG. 9 may execute the set of instructions and, when executing the instructions, it may be configured to perform the process 1000. The operations of the illustrated process 1000 presented below are intended to be illustrative. In some embodiments, the process 1000 may be accomplished with one or more additional operations not described, and/or without one or more of the operations discussed. Additionally, the order in which the operations of the process 1000 as illustrated in FIG. 10 and described below is not intended to be limiting.

In 1010, an obtaining device (e.g., the card sensor 902, the iris collector 903, the fingerprint reader 904, the input device 905) may obtain identification information associated with a requestor. As described in connection with FIG. 9, the identification information associated with the requestor may include the card information, the iris information, the fingerprint information, etc.

In 1020, the processing device 906 may analyze the identification information. In some embodiments, the processing device 906 may obtain reference identification information from a storage device (e.g., the storage 150) as described elsewhere in the present disclosure. The processing device 906 may also compare the identification information with the reference identification information. The reference identification information may include reference card information that has been registered to the bicycle sharing system, reference iris information that has been registered to the bicycle sharing system, reference fingerprint information that has been registered to the bicycle sharing system, etc. For example, the processing device 906 may compare the card information with the reference card information and determine whether the card information is consistent with the reference card information. According to a result of the determination that the card information is consistent with the reference card information, the processing device 906 may determine that the requestor has permission to use the bicycle. As another example, the processing device 906 may compare the iris information with the reference iris information and determine whether the iris information is consistent with the reference iris information. According to a result of the determination that the iris information is consistent with the reference iris information, the processing device 906 may determine that the requestor has permission to use the bicycle. As a further example, the processing device 906 may compare the fingerprint information with the reference fingerprint information and determine whether the fingerprint information is consistent with the reference fingerprint information. According to a result of the determination that the fingerprint information is consistent with the reference fingerprint information, the processing device 906 may determine that the requestor has permission to use the bicycle.

In 1030, the processing device 906 may generate an unlocking instruction based on the analysis result. The processing device 906 may transmit the unlocking instruction to the control component 420 to actuate the lock 170 to unlock the bicycle.

It should be noted that the above description of the mode switching process is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 11:
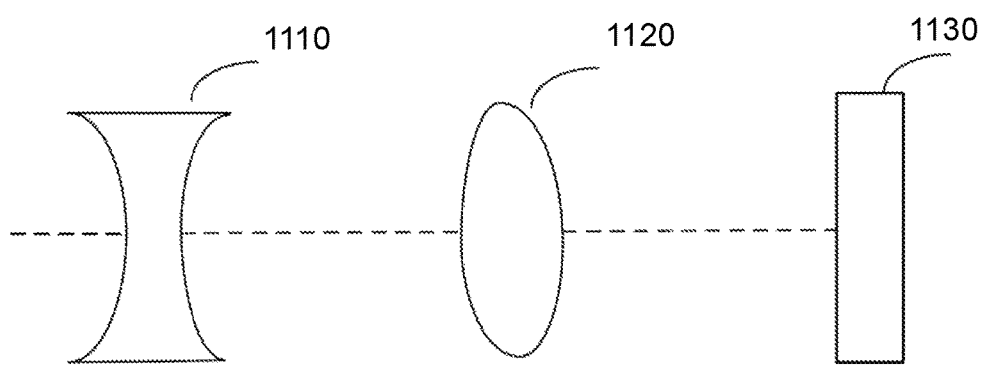
FIG. 11 is a schematic diagram illustrating an exemplary iris collector according to some embodiments of the present disclosure.

FIG. 11 is a schematic diagram illustrating an exemplary iris collector according to some embodiments of the present disclosure. The iris collector 903 may include a concave mirror 1110, a lens 1120, and an imaging sensor 1130.

As illustrated, the concave mirror 1110 may be placed opposite to the imaging sensor 1130, and the lens 1120 may be placed between the concave mirror 1110 and the imaging sensor 1130. The reflection surface of the concave mirror 1110 may face towards a target iris (e.g., an iris of a requestor) and the lens 1120 may collect the iris information associated with the requestor. Further, the imaging sensor 1130 may generate an image based on lights traveling through the lens.

Figure 12:
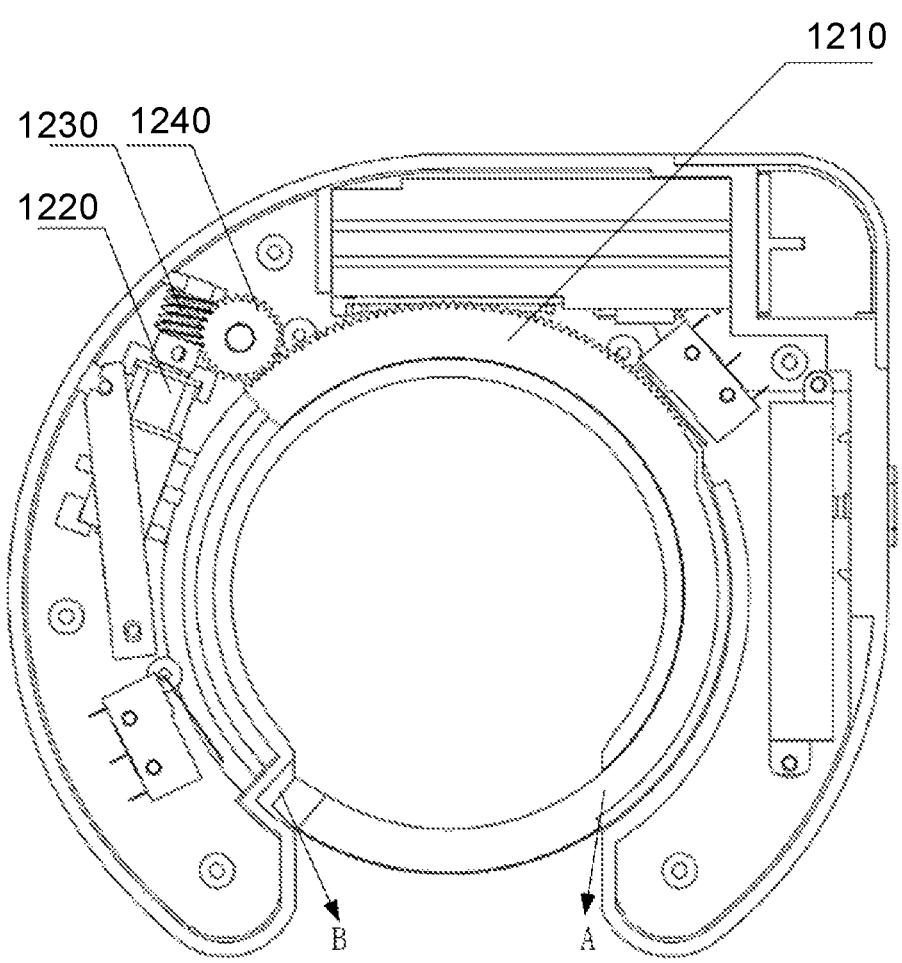
FIG. 12 is a schematic diagram illustrating an exemplary structure of a lock according to some embodiments of the present disclosure.

FIG. 12 is a schematic diagram illustrating an exemplary structure of the lock 170 according to some embodiments of the present disclosure. In some embodiments, the control component 420 may be executed via one or more components illustrated in FIG. 12. As illustrated, the structure of the lock 170 may include a lock tongue 1210 and a mechanical drive component including a motor 1220 (e.g., a direct current motor), a worm 1230, and a worm gear 1240. Position "A" refers to an exit of the lock tongue 1210, and position "B" refers to an "OFF" position of the lock 170.

In some embodiments, the lock 170 may receive an unlocking instruction via the communication port 440. The communication port 440 may determine an unlocking signal based on the unlocking instruction and transmit the unlocking signal to the motor 1220. After receiving the unlocking signal, the motor 1220 may rotate its output shaft, driving the worm 1230 to rotate along a first unlocking direction and simultaneously driving the worm gear 1240 to rotate along a second unlocking direction, wherein the first unlocking direction may be perpendicular to the second unlocking direction. The rotating worm gear 1240 may further drive the lock tongue 1210 to move from position "B" to position "A" through gear mesh, thereby unlocking the lock 170.

In some embodiments, the lock 170 may receive a locking instruction via the communication port 440. The communication port 440 may determine a locking signal based on the locking instruction and transmit the locking signal to the motor 1220. In some embodiments, the lock 170 may receive a manual locking operation on a locking button (not shown) from a requestor. After receiving the locking signal or the locking operation, the motor 1220 may rotate its output shaft, driving the worm 1230 to rotate along a first locking direction and simultaneously driving the worm gear 1240 to rotate along a second locking direction, wherein the first locking direction may be perpendicular to the second locking direction. The rotating worm gear 1240 may further drive the lock tongue 1210 to move from position "A" to position "B" through gear mesh, thereby locking the lock 170. The first locking direction may be opposite to the first unlocking direction and the second locking direction may be opposite to the second unlocking direction.

Figure 13:
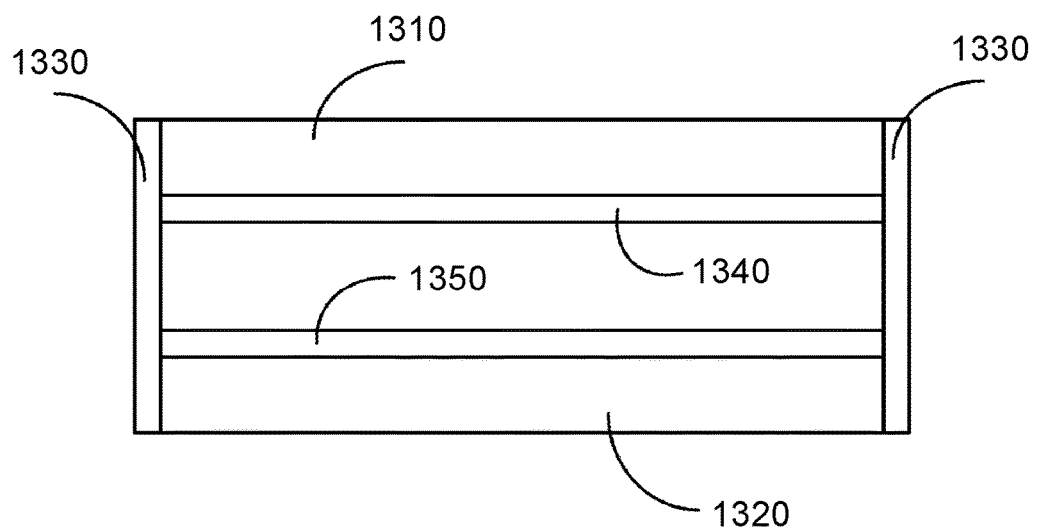
FIG. 13 is a schematic diagram illustrating an exemplary power supply according to some embodiments of the present disclosure.

FIG. 13 is a schematic diagram illustrating an exemplary power supply 460 according to some embodiments of the present disclosure. In some embodiments, the power supply 460 may be a solar panel. The solar panel may include a first optical waveguide component 1310 and a second optical waveguide component 1320. As illustrated, the first optical waveguide component 1310 may be placed opposite to the second optical waveguide component 1320 and the first optical waveguide component 1310 may be parallel to the second optical waveguide component 1320. Side surfaces of the first optical waveguide component 1310 and side surfaces of the second optical waveguide component 1320 may be tight coupled via solar cells 1330.

In some embodiments, a surface of the first optical waveguide component 1310 facing towards the second optical waveguide component 1320 may be coated with a first fluorescent layer 1340 and a surface of the second optical waveguide component 1320 facing towards the first optical waveguide component 1310 may be coated with a second fluorescent layer 1350. The first fluorescent layer 1340 and the second fluorescent layer 1350 may be films fabricated from fluorescent materials. The fluorescent materials may include inorganic fluorescent materials and organic fluorescent materials. The inorganic fluorescent materials may include rare earth phosphors, inorganic semiconductor phosphors, quantum dots, etc. The organic fluorescent materials may include small molecular luminescent materials, macromolecular luminescent materials, etc.

In some embodiments, there may be a gap between the first optical waveguide component 1310 and the second optical waveguide component 1320. The gap may be filled with vacuum, air, inert gas, etc. The width of the gap may be default settings (e.g., in a range of 7 mm to 30 mm) of the bicycle sharing system, or may be adjustable in different situations. In some embodiments, the first optical waveguide component 1310 and the second optical waveguide component 1320 may be made of polygonal plate glasses with the same size. The thicknesses of the first optical waveguide component 1310 and the second optical waveguide component 1320 may be 1 mm-10 mm.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable medium having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A bicycle sharing system, comprising:
a lock for a bicycle, including:
   a storage device;
   a locking mechanism configured to move between a locking position of the lock so that the bicycle can be used and an unlocking position of the lock so that the bicycle cannot be used; and
   a controller configured to actuate the locking mechanism to lock or unlock the lock; and
a server including:
   a storage device including a set of instructions; and
   a processor in communication with the storage device, wherein when executing the set of instructions, the processor is configured to cause the server to:
      receive, via a network, a first service request for bicycle sharing to unlock the lock from a terminal device, the first service request being associated with a wireless connection between the lock and the terminal device; and
      transmit, via the network, a password associated with the first service request to the terminal device,
   wherein the controller of the lock is further configured to:
      receive an input associated with the terminal device;
      determine whether the received input satisfies an unlocking condition; and
      actuate, based on a result of the determination that the received input satisfies the unlocking condition, the locking mechanism to unlock the lock, the unlocking condition be relating to a pre-stored password stored in the storage device of the lock, wherein the pre-stored password is obtained by the lock from the server at a time point when a preceding service transaction associated with a preceding service request is completed and before receiving the first service request for bicycle sharing.

2. The system of claim 1, wherein to determine whether the received input satisfies an unlocking condition, the controller is further configured to:
- determine whether the password included in the received input associated with the terminal device is consistent with the pre-stored password stored in the storage device of the lock; and
- determine, based on a result of the determination that the password included in the received input associated with the terminal device is consistent with the pre-stored password stored in the storage device of the lock, that the received input satisfies the unlocking condition.

3. The system of claim 1, wherein the pre-stored password includes a plurality of candidate passwords and each of the plurality of candidate passwords corresponds to a valid period.

4. The system of claim 1, wherein the lock has a plurality of modes including a dormant mode and a working mode, and the controller of the lock is further configured to:
- determine whether a service transaction associated with the first service request is completed; and
- set, based on a result of the determination that the service transaction associated with the first service request is completed, the mode of the lock to the dormant mode.

5. The system of claim 4, wherein the controller of the lock is further configured to:
- determine whether a password associated with a second service request for bicycle sharing is obtained; and
- set, based on a result of the determination that the password associated with the second service request is obtained, the mode of the lock to the working mode.

6. The system of claim 1, the lock further including a communication port, wherein the controller of the lock is further configured to:
- determine lock information associated with the lock; and
- determine service information based, at least in part, on the lock information, the communication port being configured to transmit the service information to the server.

7. The system of claim 6, wherein the lock information includes at least one of lock identification information, a time point when the lock is unlocked, or a time point when the lock is locked; and wherein the service information includes at least one of the lock information, a user identity associated with the terminal device, a start location associated with the first service request, or a destination associated with the first service request.

8. The system of claim 6, wherein the controller of the lock is further configured to:
- determine whether a connection between the lock and the server is established; and
- store, based on a result of the determination that the connection is not established, the service information in the storage device of the lock.

9. A method implemented on a bicycle sharing system including a lock for a bicycle and a server, comprising:
- receiving, by the server via a network, a first service request for bicycle sharing to unlock the lock from a terminal device, the first service request being associated with a wireless connection between the lock and the terminal device;
- transmitting, by the server via the network, a password associated with the first service request to the terminal device;
- receiving, by the lock, an input associated with the terminal device;
- determining, by the lock, whether the received input satisfies an unlocking condition; and
- actuating, by the lock, based on a result of the determination that the received input satisfies the unlocking condition, a locking mechanism to unlock the lock, the unlocking condition be relating to a pre-stored password stored in a storage device of the lock, wherein the pre-stored password is obtained by the lock from the server at a time point when a preceding service transaction associated with a preceding service request is completed and before receiving the first service request for bicycle sharing.

10. The method of claim 9, wherein the determining whether the received input satisfies an unlocking condition includes:
- determining, by the lock, whether the password included in the received input associated with the terminal device is consistent with the pre-stored password stored in the storage device of the lock; and
- determining, by the lock, based on a result of the determination that the password included in the received input associated with the terminal device is consistent with the pre-stored password stored in the storage device of the lock, that the received input satisfies the unlocking condition.

11. The method of claim 9, wherein the pre-stored password includes a plurality of candidate passwords and each of the plurality of candidate passwords corresponds to a valid period.

12. The method of claim 9, wherein the lock has a plurality of modes including a dormant mode and a working mode, and the method further includes:
- determining, by the lock, whether a service transaction associated with the first service request is completed; and
- setting, by the lock, based on a result of the determination that the service transaction associated with the first service request is completed, the mode of the lock to the dormant mode.

13. The method of claim 12, wherein the method further includes:
- determining, by the lock, whether a second password associated with a second service request for bicycle sharing is obtained; and
- setting, by the lock, based on a result of the determination that the second password associated with the second service request is obtained, the mode of the lock to the working mode.

14. The method of claim 9, wherein the method further includes:
- determining, by the lock, lock information associated with the lock; and
- determining, by the lock, service information based, at least in part, on the lock information; and
- transmitting, by the lock, the service information to the server.

15. The method of claim 14, wherein the lock information includes at least one of lock identification information, a time point when the lock is unlocked, or a time point when the lock is locked; and wherein the service information includes at least one of the lock information, a user identity associated with the terminal device, a start location associated with the first service request, or a destination associated with the first service request.

16. The method of claim 14, wherein the method further includes:

determining whether a connection between the lock and the server is established; and storing, based on a result of the determination that the connection is not established, the service information in the storage device of the lock.

17. A non-transitory computer-readable medium embodying a computer program product, the computer program product comprising instructions configured to cause a computing device to perform a method, the method comprising:

receiving, via a network, a first service request for bicycle sharing to unlock a lock for a bicycle from a terminal device, the first service request being associated with a wireless connection between the lock and the terminal device; and transmitting, via the network, a password associated with the first service request to the terminal device;

receiving, by the lock, an input associated with the terminal device;

determining, by the lock, whether the received input satisfies an unlocking condition; and actuating, by the lock, based on a result of the determination that the received input satisfies the unlocking condition, a locking mechanism to unlock the lock, the unlocking condition be relating to a pre-stored password stored in a storage device of the lock, wherein the pre-stored password is obtained by the lock from the computing device at a time point when a prior preceding service transaction associated with a preceding service request is completed and before receiving the first service request for bicycle sharing.

18. A lock for a bicycle, comprising:

a storage device;

a locking mechanism configured to move between a locking position of the lock and an unlocking position of the lock;

a communication port; and a controller configured to:

receive an input associated with a terminal device, the received input including unlocking information received by the terminal device from a server in response to a first service request for bicycle sharing transmitted from the terminal device to the server to unlock the lock, the service request including information relating to a wireless connection between the communication port and the terminal device;

determine whether the received input satisfies an unlocking condition; and actuate, based on a result of the determination that the received input satisfies the unlocking condition, the locking mechanism to unlock the lock, the unlocking condition be relating to a pre-stored password stored in the storage device of the lock, wherein the pre-stored password is obtained by the lock from the server at a time point when a preceding service transaction associated with a preceding service request is completed and before receiving the first service request for bicycle sharing.

19. The lock of claim 18, wherein to determine whether the received input satisfies an unlocking condition, the controller is further configured to:

determine whether the password included in the received input associated with the terminal device is consistent with the pre-stored password stored in the storage device of the lock; and determine, based on a result of the determination that the password included in the received input associated with the terminal device is consistent with the pre-stored password stored in the storage device of the lock, that the received input satisfies the unlocking condition.

20. The lock of claim 18, wherein the lock has a plurality of modes including a dormant mode and a working mode, and the controller of the lock is further configured to:

determine whether a service transaction associated with the first service request is completed; and set, based on a result of the determination that the service transaction associated with the first service request is completed, the mode of the lock to the dormant mode.

21. The lock of claim 20, wherein the controller of the lock is further configured to:

determine whether a password associated with a second service request for bicycle sharing is obtained; and set, based on a result of the determination that the password associated with the second service request is obtained, the mode of the lock to the working mode.

\* \* \* \* \*